(12) United States Patent
Geng et al.

(10) Patent No.: US 12,745,154 B2
(45) Date of Patent: Sep. 22, 2026

(54) COMMUNICATION METHOD AND COMMUNICATION APPARATUS

(71) Applicant: Huawei Technologies Co., Ltd., Shenzhen (CN)

(72) Inventors: Tingting Geng, Shanghai (CN); Yedan Wu, Shanghai (CN); Xingxing Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 18/308,511

(22) Filed: Apr. 27, 2023

(65) Prior Publication Data

US 2023/0262567 A1 Aug. 17, 2023

Related U.S. Application Data

(63) Continuation of application No. PCT/CN2021/127021, filed on Oct. 28, 2021.

(51) Int. Cl.
*H04W 36/30* (2009.01)
*H04W 36/36* (2009.01)

(52) U.S. Cl.
CPC ......... *H04W 36/305* (2018.08); *H04W 36/30* (2013.01); *H04W 36/362* (2023.05)

(58) Field of Classification Search
CPC . H04W 36/362; H04W 36/30; H04W 36/305; H04W 36/00833; H04W 24/02
See application file for complete search history.

(56) References Cited

U.S. PATENT DOCUMENTS

| | | | | |
|---|---|---|---|---|
| 12,556,995 B2 * | 2/2026 | Awada | H04W 36/28 | |
| 2013/0281095 A1 * | 10/2013 | Wang | H04W 36/0009 | 455/436 |
| 2013/0331105 A1 * | 12/2013 | Olofsson | H04W 36/0005 | 455/438 |
| 2014/0043982 A1 * | 2/2014 | Bodog | H04W 24/08 | 370/242 |
| 2014/0177429 A1 * | 6/2014 | Patil | H04W 76/18 | 370/242 |
| 2014/0362717 A1 * | 12/2014 | Koskinen | H04W 36/08 | 370/252 |

(Continued)

FOREIGN PATENT DOCUMENTS

| | | | | |
|---|---|---|---|---|
| CN | 103607742 A | 2/2014 | | |
| KR | 20120030946 A | 3/2012 | | |
| WO | WO-2008039124 A1 * | 4/2008 | H04W 36/00835 | |

OTHER PUBLICATIONS

Huawei et al: "Discussion on handover related SON aspects", 3GPP Draft; R2-2101251, 3rd Generation Partnership Project (3GPP), Mobile Competence Centre; 650, Route Des Lucioles; F-06921 Sophia-Antipolis Cedex; France, vol. RAN WG2, No. electronic; 2020012, Jan. 25-Feb. 5, 2020, 22 pages.

(Continued)

*Primary Examiner* — Mehmood B. Khan
(74) *Attorney, Agent, or Firm* — Slater Matsil, LLP

(57) ABSTRACT

A communication method and a communication apparatus. The method includes recording first information after a terminal device is successfully handed over from a first network device to a target network device, and recording second information after a connection between the terminal device and the target network device fails.

19 Claims, 4 Drawing Sheets

(56) References Cited

U.S. PATENT DOCUMENTS

| | | | | |
|---|---|---|---|---|
| 2017/0251409 | A1* | 8/2017 | Wegmann | H04W 76/19 |
| 2019/0387440 | A1* | 12/2019 | Yiu | H04W 36/0072 |
| 2022/0078686 | A1* | 3/2022 | Yiu | H04W 36/00 |
| 2023/0239752 | A1* | 7/2023 | Balan | H04W 36/0058<br>370/331 |
| 2023/0269636 | A1* | 8/2023 | Lee | H04W 36/305<br>370/331 |
| 2023/0292214 | A1* | 9/2023 | Yan | H04W 36/362 |

OTHER PUBLICATIONS

Huawei: "(TP for SON BLCR for 38.300) Mobility Enhancement Optimization", 3GPP Draft; R3-206196, 3rd Generation Partnership Project (3GPP), Mobile Competence Centre; 650, route des Lucioles; F-06921 Sophia-Antipolis Cedex; France, vol. RAN WG3, No. e-meeting, Nov. 2-12, 2020, 12 pages.

* cited by examiner

200

S210: Record first information and start a timer after successfully handed over to a target network device from a first network device S220: Determine a processing manner of the first information depending on whether the timer is running S230: Send the first information or second information

500

S510: Record first information after determining that a terminal device is successfully handed over from a first network device to a target network device S520: Record second information when determining that a connection to the target network device fails S530: Send the first information and the second information

COMMUNICATION METHOD AND COMMUNICATION APPARATUS

CROSS-REFERENCE TO RELATED APPLICATIONS

This application is a continuation of International Application No. PCT/CN2021/127021, filed on Oct. 28, 2021, which claims priority to International Application No. PCT/CN2020/124539, filed on Oct. 28, 2020. The disclosures of the aforementioned applications are hereby incorporated by reference in their entireties.

TECHNICAL FIELD

Embodiments of this application relate to the communication field, and more specifically, to a communication method and a communication apparatus.

BACKGROUND

In a mobile communication network, to reduce problems such as a premature handover, a delayed handover, and a ping-pong handover in handovers such as an intra-frequency handover, an inter-frequency handover, and an inter-RAT handover caused by improper network parameter settings, currently, a system supports a mobility robustness optimization (MRO) mechanism. The MRO mechanism is an important mechanism for network self-optimization. When a mobility-related exception (such as a handover failure or a radio link failure in a target cell) occurs on a terminal device, the terminal device reports mobility-related exception parameters to a network device, and the network device may autonomously analyze and optimize network parameters based on the related parameters reported by the terminal device. However, as types of mobility reports of the terminal device increase, how to properly process a plurality of mobility reports to improve network mobility management performance becomes a current research hotspot.

SUMMARY

Embodiments of this application provide a communication method and a communication apparatus, to improve network mobility management performance.

According to a first aspect, a communication method is provided. The method may be performed by a terminal device or a component (such as a chip or a circuit) disposed (or used) in the terminal device. An example in which the method is performed by the terminal device is used below for description.

The method includes: The terminal device records first information and starts a timer after the terminal device is successfully handed over from a first network device to a target network device, where the first information indicates that the terminal device is successfully handed over from the first network device to the target network device. The terminal device records second information and deletes the first information when a connection between the terminal device and the target network device fails during running of the timer, where the second information indicates that the connection between the terminal device and the target network device fails. Alternatively, the terminal device sends the first information when no connection between the terminal device and the target network device fails during running of the timer.

Optionally, the method further includes: The terminal device sends the second information.

According to the foregoing solution, the terminal device may determine, depending on whether the connection fails during the running of the timer, whether there is a failure risk after the successful handover, or whether the successful handover is stable, so as to determine a processing manner of the first information. This can reduce the information recorded by the terminal device, and reduce air interface signaling overheads caused by reporting of the recorded information by the terminal device. The first network device may determine a mobility management parameter of the first network device based on the obtained first information (a part or all) or second information (a part or all). This solution can improve network mobility management performance, and improve network communication service quality.

With reference to the first aspect, in some implementations of the first aspect, the second information includes one or more of the following: associated event indication information, where the associated event indication information indicates that the first information has been recorded in a mobility event corresponding to the second information; second indication information, used to determine a moment at which the terminal device receives a mobility command or a moment at which the terminal device determines to trigger a conditional handover; identifier information of a first cell, where the first cell is a serving cell that is of the terminal device before the handover and that is managed by the first network device; and first identifier information of the terminal device, where the first identifier information is identifier information of the terminal device in the first cell.

According to the foregoing solution, the second information may include the associated event indication information, so that the first network device can determine that the connection between the terminal device and the target network device has been successfully established, but the connection fails during the running of the timer. A degree to which the first network device can determine or adjust the mobility management parameter with reference to a failure that occurs after the terminal device is successfully handed over may be different from a degree of determining or adjusting the mobility management parameter based on a case in which the handover fails. In this way, a network configuration can be optimized more accurately, and a probability of a mobility failure of the terminal device can be reduced. In addition, the second information may include the second indication information, the identifier information of the first cell, and the first identifier information of the terminal device, so that the first network device can determine the terminal device corresponding to the second information.

With reference to the first aspect, in some implementations of the first aspect, the second indication information includes a time interval T1 and a time interval T2, where the time interval T2 is a time interval between the connection between the terminal device and the target network device failing and the second information being sent, and the time interval T1 is a time interval between the terminal device receiving the mobility command and the connection between the terminal device and the target network device failing, or the time interval T1 is a time interval between the terminal device determining to trigger the conditional handover and the connection between the terminal device and the target network device failing.

With reference to the first aspect, in some implementations of the first aspect, the method further includes: The terminal device stops the timer if the connection between the terminal device and the target network device fails during the running of the timer.

According to the foregoing solution, the timer is used by the terminal device to determine whether the successful handover to the target network device is stable, and after the connection fails, the timer is stopped. This can reduce unnecessary power consumption of the terminal device.

With reference to the first aspect, in some implementations of the first aspect, the first information includes one or more of the following information: first indication information, used to determine a moment at which the terminal device receives a mobility command or a moment at which the terminal device determines to trigger a conditional handover; the identifier information of the first cell, where the first cell is the serving cell that is of the terminal device before the handover and that is managed by the first network device; and the first identifier information of the terminal device, where the first identifier information is the identifier information of the terminal device in the first cell.

According to the foregoing solution, the first information may include the first indication information, the identifier information of the first cell, and the first identifier information of the terminal device, so that the first network device can determine the terminal device corresponding to the first information.

With reference to the first aspect, in some implementations of the first aspect, the method further includes as follows.

The terminal device receives running duration of the timer from the first network device.

According to a second aspect, a communication method is provided. The method may be performed by a first network device or a component (such as a chip or a circuit) disposed (or used) in the first network device. An example in which the method is performed by the first network device is used below for description.

The method includes: The first network device receives first information or second information, where the first information indicates that a terminal device is successfully handed over from the first network device to a target network device, and the second information indicates that a connection between the terminal device and the target network device fails. The first network device determines a mobility management parameter of the first network device based on the first information or the second information.

With reference to the second aspect, in some implementations of the second aspect, the method further includes: The first network device sends running duration of a timer to the terminal device, where the timer is used by the terminal device to determine a processing manner of the first information.

With reference to the second aspect, in some implementations of the second aspect, that the first network device receives first information and/or second information includes: The first network device receives the first information and/or the second information from the terminal device, a second network device, or a core network device.

With reference to the second aspect, in some implementations of the second aspect, the method further includes: The first network device receives the running duration of the timer from the target network device or the core network device.

According to a third aspect, a communication method is provided. The method may be performed by a terminal device or a component (such as a chip or a circuit) disposed (or used) in the terminal device. An example in which the method is performed by the terminal device is used below for description.

The method includes: The terminal device records first information after the terminal device is successfully handed over from a first network device to a target network device, where the first information indicates that the terminal device is successfully handed over from the first network device to the target network device. The terminal device records second information after a connection between the terminal device and the target network device fails, where the second information indicates that the connection between the terminal device and the target network device fails, the second information includes first indication information, and the first indication information is used to determine a moment at which the terminal device receives a mobility command or a moment at which the terminal device triggers a conditional handover. The terminal device sends the first information and the second information.

According to the foregoing solution, the terminal device sends the first information and the second information to the network device, where the second information includes the first indication information. In this way, the network device may determine, based on a time point of a connection failure corresponding to the second information, whether the second information is related to the handover of the terminal device, and in a related case, optimize a mobility management parameter based on the second information or based on the first information and the second information. Alternatively, the terminal device may determine by using a timer that the successful handover is unstable, and record association indication information in the first information and/or the second information. In this way, the network device can establish an association, and obtain a status of the terminal device after the handover more accurately, so that the network device can perform mobility management more accurately, network mobility management performance can be improved, and network communication service quality is improved.

With reference to the third aspect, in some implementations of the third aspect, the first indication information includes first time information and/or first identifier information of the terminal device in a first cell, where the first time information indicates a time interval between the terminal device receiving the mobility command or the terminal device determining to trigger the conditional handover to the second information being sent, and the first cell is a serving cell that is of the terminal device before the handover and that is managed by the first network device.

With reference to the third aspect, in some implementations of the third aspect, the first time information includes a time interval T1 and a time interval T2, the time interval T2 is a time interval between the connection failing and the second information being sent, and the time interval T1 is a time interval between the terminal device receiving the mobility command and the connection between the terminal device and the target network device failing, or the time interval T1 is a time interval between the terminal device determining to trigger the conditional handover and the connection between the terminal device and the target network device failing.

With reference to the third aspect, in some implementations of the third aspect, the method further includes: The terminal device starts the timer after the terminal device is successfully handed over from the first network device to the target network device; and the recording second information includes: The terminal device records the second information after the connection between the terminal device and the target network device fails during running of the timer. The second information includes second associated event indication information, and the second associated event indication information indicates that the terminal device has recorded or reported the first information in a mobility event corresponding to the second information.

With reference to the third aspect, in some implementations of the third aspect, the method further includes as follows.

The terminal device records first associated event indication information in the first information if the connection between the terminal device and the target network device fails during the running of the timer, where the first associated event indication information indicates that the terminal device has recorded or reported the second information in a mobility event corresponding to the first information, and/or the first associated event indication information indicates that the connection between the terminal device and the target network device fails during the running of the timer.

With reference to the third aspect, in some implementations of the third aspect, the method further includes: The terminal device stops the timer when the connection between the terminal device and the target network device fails during the running of the timer.

With reference to the third aspect, in some implementations of the third aspect, the first information includes second indication information, and the second indication information further includes one or more of the following: identifier information of the first cell, first identifier information of the terminal device, or second time information. The second time information indicates a time interval between the terminal device receiving the mobility command and the first information being sent, or indicates a time interval between the terminal device determining to trigger the conditional handover and the first information being sent.

With reference to the third aspect, in some implementations of the third aspect, the method further includes: The terminal device receives running duration of the timer from the first network device.

According to a fourth aspect, a communication method is provided. The method may be performed by a first network device or a component (such as a chip or a circuit) disposed (or used) in the first network device. An example in which the method is performed by the first network device is used below for description.

The method includes: The first network device receives first information, where the first information indicates that a terminal device is successfully handed over from the first network device to a target network device. The first network device receives second information, where the second information indicates that a connection between the terminal device and the target network device fails, the second information includes first indication information, and the first indication information is used to determine a moment at which the terminal device receives a mobility command or a moment at which the terminal device triggers a conditional handover. The first network device determines, based on the first indication information, whether the first information and the second information are information in a same handover event.

For specific descriptions of content included in the first information, the second information, and the like, refer to the descriptions in the third aspect. For brevity, details are not described again.

With reference to the fourth aspect, in some implementations of the fourth aspect, the method further includes: The first network device sends running duration of a timer to the terminal device, where the timer is used by the terminal device to determine whether to record first associated record information and/or second associated record information.

With reference to the fourth aspect, in some implementations of the fourth aspect, before that the first network device sends running duration of a timer to the terminal device, the method further includes: The first network device receives the running duration of the timer sent by the target network device or a core network device.

With reference to the fourth aspect, in some implementations of the fourth aspect, the method further includes: The first network device determines, based on the first indication information, that a moment at which the terminal device corresponding to the first information receives the mobility command is the same as the moment at which the terminal device corresponding to the second information receives the mobility command. The first network device determines that the first information and the second information are information in a same handover event.

With reference to the fourth aspect, in some implementations of the fourth aspect, the method further includes: The first network device determines a mobility management parameter of the first network device based on the first information and/or the second information.

With reference to the fourth aspect, in some implementations of the fourth aspect, that the first network device determines a mobility management parameter of the first network device based on the first information and/or the second information includes: The first network device determines that the connection between the terminal device and the target network device fails within a first time interval after the terminal device receives the mobility command or the terminal device triggers the conditional handover, or within a second time interval after the terminal device is successfully handed over to the target network device. The first network device determines the mobility management parameter of the first network device based on the second information, or determines the mobility management parameter of the first network device based on the first information and the second information.

With reference to the fourth aspect, in some implementations of the fourth aspect, that the first network device determines a mobility management parameter of the first network device based on the first information and/or the second information includes: The first network device determines that the connection between the terminal device and the target network device fails after a first time interval after the terminal device receives the mobility command or the terminal device triggers conditional handover, or after a second time interval after the terminal device is successfully handed over to the target network device. The first network device determines the mobility management parameter of the first network device based on the first information.

According to a fifth aspect, a communication apparatus is provided. In a design, the apparatus may include corresponding modules for performing the method/operations/steps/actions described in the first aspect. The modules may be implemented by using a hardware circuit, software, or a combination of a hardware circuit and software. In a design, the apparatus includes: a processing unit, configured to record first information and start a timer after a terminal device is successfully handed over from a first network device to a target network device, where the first information indicates that the terminal device is successfully handed over from the first network device to the target network device. The processing unit is further configured to record second information and delete the first information when a connection between the terminal device and the target network device fails during running of the timer, where the second information indicates that the connection between the terminal device and the target network device fails. The apparatus includes a transceiver unit, configured to send the first information when a connection between the terminal device and the target network device fails during running of the timer.

With reference to the fifth aspect, in some implementations of the fifth aspect, the transceiver unit is configured to send the second information when the connection between the terminal device and the target network device fails during the running of the timer.

With reference to the fifth aspect, in some implementations of the fifth aspect, the second information includes one or more of the following: associated event indication information, where the associated event indication information indicates that the first information has been recorded in a mobility event corresponding to the second information; second indication information, used to determine a moment at which the terminal device receives a mobility command or a moment at which the terminal device determines to trigger a conditional handover; identifier information of a first cell, where the first cell is a serving cell that is of the terminal device before the handover and that is managed by the first network device; and first identifier information of the terminal device, where the first identifier information is identifier information of the terminal device in the first cell.

With reference to the fifth aspect, in some implementations of the fifth aspect, the second indication information includes a time interval T1 and a time interval T2, where the time interval T2 is a time interval between the connection between the terminal device and the target network device failing and the second information being sent, and the time interval T1 is a time interval between the terminal device receiving the mobility command and the connection between the terminal device and the target network device failing, or the time interval T1 is a time interval between the terminal device determining to trigger the conditional handover and the connection between the terminal device and the target network device failing.

With reference to the fifth aspect, in some implementations of the fifth aspect, the processing unit is further configured to stop the timer when the connection between the terminal device and the target network device fails during the running of the timer.

With reference to the fifth aspect, in some implementations of the fifth aspect, the first information includes one or more of the following information: first indication information, used to determine a moment at which the terminal device receives a mobility command or a moment at which the terminal device determines to trigger a conditional handover; the identifier information of the first cell, where the first cell is the serving cell that is of the terminal device before the handover and that is managed by the first network device; and the first identifier information of the terminal device, where the first identifier information is the identifier information of the terminal device in the first cell.

With reference to the fifth aspect, in some implementations of the fifth aspect, the transceiver unit is further configured to receive running duration of the timer from the first network device.

According to a sixth aspect, a communication apparatus is provided. In a design, the apparatus may include corresponding modules for performing the method/operations/steps/actions described in the first aspect. The modules may be implemented by using a hardware circuit, software, or a combination of a hardware circuit and software. In a design, the apparatus includes: a transceiver unit, configured to receive first information or second information, where the first information indicates that a terminal device is successfully handed over from a first network device to a target network device, and the second information indicates that a connection between the terminal device and the target network device fails; and a processing unit, configured to determine a mobility management parameter of the first network device based on the first information or the second information.

With reference to the sixth aspect, in some implementations of the sixth aspect, the transceiver unit is further configured to send running duration of a timer to the terminal device, where the timer is used by the terminal device to determine a processing manner of the first information.

With reference to the sixth aspect, in some implementations of the sixth aspect, the transceiver unit is specifically configured to receive the first information and/or the second information from the terminal device, a second network device, or a core network device.

With reference to the sixth aspect, in some implementations of the sixth aspect, the transceiver unit is further configured to receive the running duration of the timer from the target network device or the core network device.

According to a seventh aspect, a communication apparatus is provided. In a design, the apparatus may include corresponding modules for performing the method/operations/steps/actions described in the third aspect. The modules may be implemented by using a hardware circuit, software, or a combination of a hardware circuit and software. In a design, the apparatus includes: a processing unit, configured to record first information after a terminal device is successfully handed over from a first network device to a target network device, where the first information indicates that the terminal device is successfully handed over from the first network device to the target network device, where the processing unit is further configured to record second information after a connection between the terminal device and the target network device fails, where the second information indicates that the connection between the terminal device and the target network device fails, the second information includes first indication information, and the first indication information is used to determine a moment at which the terminal device receives a mobility command; and a transceiver unit, configured to send the first information, where the transceiver unit is further configured to send the second information.

With reference to the seventh aspect, in some implementations of the seventh aspect, the first indication information includes first time information and/or first identifier information of the terminal device in a first cell, where the first time information indicates a time interval between the terminal device receiving the mobility command or the terminal device determining to trigger the conditional handover to the second information being sent, and the first cell is a serving cell that is of the terminal device before the handover and that is managed by the first network device.

With reference to the seventh aspect, in some implementations of the seventh aspect, the first time information includes a time interval T1 and a time interval T2, the time interval T2 is a time interval between the connection failing and the second information being sent, and the time interval T1 is a time interval between the terminal device receiving the mobility command and the connection between the terminal device and the target network device failing, or the time interval T1 is a time interval between the terminal device determining to trigger the conditional handover and the connection between the terminal device and the target network device failing.

With reference to the seventh aspect, in some implementations of the seventh aspect, the processing unit is further configured to start a timer after the terminal device is successfully handed over from the first network device to the target network device; and the processing unit is specifically configured to record the second information when the connection between the terminal device and the target network device fails during running of the timer, where the second information includes second associated event indication information, and the second associated event indication information indicates that the terminal device has recorded or reported the first information in a mobility event corresponding to the second information.

With reference to the seventh aspect, in some implementations of the seventh aspect, the processing unit is further configured to record first associated event indication information in the first information when the connection between the terminal device and the target network device fails during the running of the timer, where the first associated event indication information indicates that the terminal device has recorded or reported the second information in a mobility event corresponding to the first information, and/or the first associated event indication information indicates that the connection between the terminal device and the target network device fails during the running of the timer.

With reference to the seventh aspect, in some implementations of the seventh aspect, the processing unit is further configured to stop the timer when the connection between the terminal device and the target network device fails during the running of the timer.

With reference to the seventh aspect, in some implementations of the seventh aspect, the first information includes second indication information, and the second indication information further includes one or more of the following: identifier information of a first cell, where the first cell is a serving cell that is of the terminal device before the handover and that is managed by the first network device; first identifier information of the terminal device, where the first identifier information is identifier information of the terminal device in the first cell; and second time information, indicating a time interval between the terminal device receiving a mobility command and the first information being sent, or indicating a time interval between the terminal device determining to trigger conditional handover and the first information being sent.

With reference to the seventh aspect, in some implementations of the seventh aspect, the transceiver unit is further configured to receive running duration of the timer from the first network device.

According to an eighth aspect, a communication apparatus is provided. In a design, the apparatus may include corresponding modules for performing the method/operations/steps/actions described in the fourth aspect. The modules may be implemented by using a hardware circuit, software, or a combination of a hardware circuit and software. In a design, the apparatus includes: a transceiver unit, configured to receive first information, where the first information indicates that a terminal device is successfully handed over from a first network device to a target network device, where the processing unit is further configured to receive second information, where the second information indicates that a connection between the terminal device and the target network device fails, the second information includes first indication information, and the first indication information is used to determine a moment at which the terminal device receives a mobility command or a moment at which the terminal device triggers a conditional handover; and a processing unit, configured to determine, based on the first indication information, whether the first information and the second information are information in a same handover event.

With reference to the eighth aspect, in some implementations of the eighth aspect, the first indication information includes first time information and/or first identifier information of the terminal device, where the first identifier information is identifier information of the terminal device in a first cell, the first time information indicates a time interval between the terminal device receiving the mobility command and the second information being sent, or indicates a time interval between the terminal device determining to trigger the conditional handover and the second information being sent, and the first cell is a serving cell that is of the terminal device before the handover and that is managed by the first network device.

With reference to the eighth aspect, in some implementations of the eighth aspect, the first time information includes a time interval T1 and a time interval T2, the time interval T2 is a time interval between a mobility-related failure and the second information being sent, and the time interval T1 is a time interval between the terminal device receiving the mobility command and the connection between the terminal device and the target network device failing, or the time interval T1 is a time interval between the terminal device determining to trigger the conditional handover and the connection between the terminal device and the target network device failing.

With reference to the eighth aspect, in some implementations of the eighth aspect, the second information includes second associated event indication information, and the second associated event indication information indicates that the terminal device has recorded or reported the first information in a mobility event corresponding to the second information; and/or the first information includes first associated event indication information, and the first associated event indication information indicates that the terminal device has recorded or reported the second information in a mobility event corresponding to the first information, and/or indicates whether the connection between the terminal device and the target network device fails during running of a timer.

With reference to the eighth aspect, in some implementations of the eighth aspect, the transceiver unit is further configured to send the running duration of the timer to the terminal device, where the timer is used by the terminal device to determine whether to record the first associated event indication information and/or the second associated event indication information.

With reference to the eighth aspect, in some implementations of the eighth aspect, the transceiver unit in the apparatus is further configured to receive the running duration of the timer sent by the target network device or a core network device.

With reference to the eighth aspect, in some implementations of the eighth aspect, the first information further includes second indication information, and the second indication information includes one or more of the following: identifier information of a first cell, where the first cell is a serving cell that is of the terminal device before the handover and that is managed by the first network device; first identifier information of the terminal device, where the first identifier information is identifier information of the terminal device in the first cell; and second time information, indicating a time interval between the terminal device receiving a mobility command and the first information being sent, or indicating a time interval between the terminal device determining to trigger conditional handover and the first information being sent.

With reference to the eighth aspect, in some implementations of the eighth aspect, the processing unit in the apparatus is further configured to determine, based on the first indication information, that a moment at which the terminal device corresponding to the first information receives a mobility command is the same as a moment at which the terminal device corresponding to the second information receives a mobility command. The processing unit is further configured to determine that the first information and the second information are information in a same handover event.

With reference to the eighth aspect, in some implementations of the eighth aspect, the processing unit is further configured to determine a mobility management parameter of the first network device based on the first information and/or the second information.

With reference to the eighth aspect, in some implementations of the eighth aspect, the processing unit is specifically configured to determine that the connection between the terminal device and the target network device fails within a first time interval after the terminal device receives the mobility command or the terminal device triggers the conditional handover, or within a second time interval after the terminal device is successfully handed over to the target network device. The processing unit is specifically configured to determine the mobility management parameter of the first network device based on the second information, or determine the mobility management parameter of the first network device based on the first information and the second information.

With reference to the eighth aspect, in some implementations of the eighth aspect, the processing unit is specifically configured to determine that the connection between the terminal device and the target network device fails after a first time interval after the terminal device receives the mobility command or the terminal device triggers the conditional handover, or after a second time interval after the terminal device is successfully handed over to the target network device. The processing unit is specifically configured to determine the mobility management parameter of the first network device based on the first information.

According to a ninth aspect, a communication apparatus is provided, including a processor. The processor can implement the method according to any one of the first aspect or the third aspect and the possible implementations of the first aspect or the third aspect. Optionally, the communication apparatus further includes a memory. The processor is coupled to the memory, and may be configured to execute instructions in the memory, to implement the method according to any one of the first aspect or the third aspect and the possible implementations of the first aspect or the third aspect. Optionally, the communication apparatus further includes a communication interface. The processor is coupled to the communication interface. In embodiments of this application, the communication interface may be a transceiver, a pin, a circuit, a bus, a module, or a communication interface of another type. This is not limited.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a tenth aspect, a communication method is provided. The method may be performed by a target network device or a component (such as a chip or a circuit) disposed (or used) in the target network device. An example in which the method is performed by the target network device is used below for description.

The method may include: If the target network device determines that the terminal device is successfully handed over to the target network device, or if the target network device receives indication information that is sent by the terminal device and that stores the first information, the target network device starts a first timer. The target network device does not request the first information from the terminal device during running of the first timer.

Optionally, when the first timer expires, the target network device may request the first information from the terminal device.

Optionally, during the running of the first timer, if the target network device hands over the terminal device to another network device, or the target network device configures the terminal device to enter a non-connected mode, or the target network device detects that a connection to the terminal device fails, the running of the first timer may be stopped.

According to the foregoing technical solution, the target network device determines, depending on whether the connection fails during the running of the first timer, whether there is a failure risk after the successful handover of the terminal device, or whether the successful handover is stable, so as to avoid requesting the first information from the terminal device when there is a failure risk after the successful handover or the successful handover is unstable.

According to an eleventh aspect, a communication apparatus is provided, including a processor. The processor may implement the method according to any one of the second aspect, the fourth aspect, or the tenth aspect and the possible implementations of the second aspect, the fourth aspect, or the tenth aspect. Optionally, the communication apparatus further includes a memory. The processor is coupled to the memory, and may be configured to execute instructions in the memory, to implement the method according to any one of the second aspect or the fourth aspect and the possible implementations of the second aspect or the fourth aspect. Optionally, the communication apparatus further includes a communication interface. The processor is coupled to the communication interface.

In an implementation, the communication apparatus is a network device. When the communication apparatus is the network device, the communication interface may be a transceiver or an input/output interface.

In another implementation, the communication apparatus is a chip disposed in a network device. When the communication apparatus is the chip disposed in the first network device, the communication interface may be an input/output interface.

Optionally, the transceiver may be a transceiver circuit. Optionally, the input/output interface may be an input/output circuit.

According to a twelfth aspect, a processor is provided, including: an input circuit, an output circuit, and a processing circuit. The processing circuit is configured to receive a signal by using the input circuit, and transmit a signal by using the output circuit, so that the processor performs the method according to any one of the first aspect to the fourth aspect, and the tenth aspect and the possible implementations of the first aspect to the fourth aspect and the tenth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in embodiments of this application.

According to a thirteenth aspect, a computer program product is provided. The computer program product includes a computer program (which may also be referred to as code or instructions). When the computer program is run, a computer is enabled to perform the method according to any one of the first aspect to the fourth aspect, and the tenth aspect and the possible implementations of the first aspect to the fourth aspect, and the tenth aspect.

According to a fourteenth aspect, a computer-readable storage medium is provided. The computer-readable storage medium stores a computer program (which may also be referred to as code or instructions). When the computer program is run on a computer, the computer is enabled to perform the method according to any one of the first aspect to the fourth aspect, and the tenth aspect and the possible implementations of the first aspect to the fourth aspect and the tenth aspect.

According to a fifteenth aspect, a communication system is provided, including at least two of the foregoing terminal device, first network device, second network device, target network device, and core network device.

DETAILED DESCRIPTION OF ILLUSTRATIVE EMBODIMENTS

Technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) communication system, vehicle-to-another device (vehicle-to-x V2X) communication, internet of vehicles, machine type communication (MTC), or internet of things (IoT). V2X may include vehicle to network (V2N), vehicle to vehicle (V2V), vehicle to infrastructure (V2I), and/or vehicle to pedestrian (V2P), and the like. The communication method provided in this application may be further applied to a future communication system, for example, a sixth generation mobile communication system. This is not limited in this application.

Figures 1, 2:
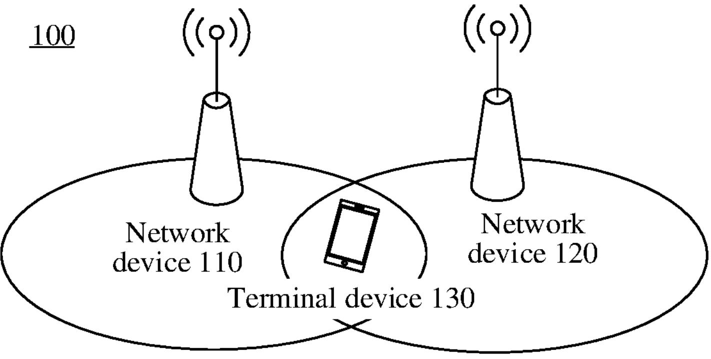
FIG. 1 is a schematic diagram of a communication system 100 applicable to an embodiment of this application.
FIG. 2 is a schematic flowchart of a communication method according to an embodiment of this application.

FIG. 1 is a schematic diagram of a wireless communication system 100 applicable to an embodiment of this application.

As shown in FIG. 1, the wireless communication system 100 may include at least two network devices, for example, a network device 110 and a network device 120 that are shown in FIG. 1. The wireless communication system 100 may further include at least one terminal device, for example, a terminal device 130 shown in FIG. 1. The network device 110 and the network device 120 may include a source network device connected to the terminal device 130 and a target network device to which the terminal device 130 needs to be handed over.

The terminal device in embodiments of this application may also be referred to as a user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (pad), a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device, a vehicle-mounted device, a wearable device, a terminal device in a 5G network, a terminal device in a future evolved public land mobile network (PLMN), or the like.

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, such as smart watches or smart glasses, and devices that focus on only one type of application and need to work with other devices such as smartphones, such as various smart bands or smart jewelry for monitoring physical signs.

In addition, the terminal device may alternatively be a terminal device in an internet of things (IoT) system. The IoT is an important part in future development of information technologies. A main technical feature of the IoT is to connect things to a network by using a communication technology, to implement an intelligent network for human-machine interconnection and thing-thing interconnection.

It should be understood that a specific form of the terminal device is not limited in embodiments of this application.

The network device in embodiments of this application may be a device with a wireless transceiver function, or may be referred to as an access network device. The device includes but is not limited to: a base station, an evolved NodeB (eNB), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), or a transmission reception point (TRP). The device may alternatively be an access network (radio access network, RAN) device in a 5G (for example, NR) system, for example, a next generation NodeB (gNB), a TRP, or a TP, or one or a group of (including a plurality of antenna panels) antenna panels of a base station in the 5G system.

In some deployments, the gNB may include a central unit (CU) and a DU. The gNB may further include an active antenna unit (AAU for short). The CU implements some functions of the gNB, and the DU implements some other functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that, the CU may further include a CU-control plane (CU-CP) and a CU-user plane (CU-UP). The CU-CP may be responsible for a control plane function, for example, implementing an RRC layer and a PDCP layer control plane function (PDCP-C). The CU-UP may be responsible for a user plane function, for example, implementing an SDAP layer and a PDCP layer user plane function (PDCP-U). The CU-CP and the CU-UP communicate with each other through an E1 interface. On behalf of the gNB, the CU-CP may communicate with a core network through an NG interface, and communicate with the DU through an F1-C interface. The CU-UP may communicate with the DU through an F1-U interface. In another implementation, the CU-UP may implement a PDCP-C function, but this application is not limited thereto. In addition, the CU may be classified into a network device in an access network (radio access network, RAN), or the CU may be classified into a network device in the core network (CN). This is not limited in this application.

The network device provides a service for a cell. The terminal device communicates with the network device in the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cells herein may include a metro cell (metro cell), a micro cell, a pico cell, a femto cell, or the like. These small cells are characterized by small coverage and low transmit power, and are applicable to providing a high rate data transmission service.

In embodiments of this application, "/" may represent an "or" relationship between associated objects. For example, A/B may represent A or B. "And/or" may indicate that there are three relationships between associated objects. For example, A and/or B may represent the following three cases: Only A exists, both A and B exist, and only B exists. A and B may be singular or plural. To facilitate description of the technical solutions in embodiments of this application, terms such as "first" and "second" may be used in embodiments of this application for distinguishing. The terms such as "first" and "second" do not limit a quantity and an execution sequence, and the terms such as "first" and "second" do not indicate a definite difference. In embodiments of this application, the terms such as "example" or "for example" are used to represent an example, an illustration, or a description. Any embodiment or design solution described with "example" or "for example" should not be explained as being more preferred or having more advantages than another embodiment or design solution. Use of the terms such as "example" or "for example" is intended to present a related concept in a specific manner for ease of understanding. In embodiments of this application, "at least one (type)" may alternatively be described as "one (type) or more (types)", and "a plurality of (types)" may be two (types), three (types), four (types), or more (types). This is not limited in this application.

It should be understood that, in embodiments of this application, the terminal device and/or the network device may perform some or all steps in embodiments of this application. These steps or operations are merely examples. In embodiments of this application, other operations or variations of various operations may further be performed. In addition, the steps may be performed in different sequences presented in embodiments of this application, and not all the operations in embodiments of this application may need to be performed.

The following briefly describes a mobility scenario of the terminal device. An example in which the network device is a base station is used for description. It should be understood that this application is not limited to the following mobility scenario.

The mobility scenario of the terminal device includes a handover scenario and a secondary node (SN) mobility scenario under dual-connectivity (DC) or multi-connectivity (MC).

The handover scenario mainly includes a scenario of handover from a source serving cell to a target serving cell, or from a source base station to a target base station in a single-connectivity scenario, and a scenario of handover from a primary serving cell to a target primary serving cell, or from a source primary base station (MN) to a target primary base station in a multi-connectivity scenario. It may be understood that in the single-connectivity scenario, the source serving cell may be understood as a primary serving cell, the target serving cell may be understood as a target primary serving cell, the source base station may be understood as a source primary base station, and the target base station may be understood as a target primary base station. The handover scenario may also be classified into a common handover scenario, a conditional handover (CHO) scenario, and a dual active protocol stack (DAPS) handover scenario.

The common handover means that the terminal device performs a handover after receiving a handover command from a source cell, is disconnected from the source cell, and establishes a connection to a target cell through a random access process. In the process of random access between the terminal device and the target cell, when the random access succeeds, the terminal device sends an RRC message (for example, an RRC reconfiguration complete message) to the target base station to which the target cell belongs, to notify the target base station that the conditional handover is completed.

The conditional handover CHO means that the source base station sends CHO configuration information to the terminal device when quality of a source link is good. The CHO configuration information may include, for example, a CHO trigger condition, and information about one or more candidate cells (for example, a CGI of the candidate cell, or primary cell information (PCI) of the candidate cell, and frequency information corresponding to the candidate cell). After receiving the configuration information of the conditional handover, the terminal device determines, based on the configuration information, whether a candidate cell meets a handover trigger condition, and uses the candidate cell that meets the handover trigger condition as the target cell. In the process of random access between the terminal device and the target cell, when the random access succeeds, the terminal device sends an RRC message (for example, an RRC reconfiguration complete message) to the target base station to which the target cell belongs, to notify the target base station that the conditional handover is completed.

The DAPS handover means that after receiving a handover command, the terminal device still maintains a connection to the source base station, and also attempts to establish a connection to the target base station. Therefore, it may be considered that in the DAPS handover scenario, the terminal device separately establishes a connection to the source base station and the target base station.

Based on different handover procedures, the handover of the terminal device may be classified into an Xn interface-based handover (Xn based HO) between the base stations and an NG interface-based handover (NG based HO) between the base station and a core network device (for example, an access and mobility management function (access and mobility management function) network element). The Xn interface-based handover means that the source base station sends a handover request of the terminal device to the target base station through an Xn interface, and when the target base station determines to agree to the handover, the source base station sends a handover command to the terminal device, to indicate the terminal device to be handed over to the target base station. The NG interface-based handover means that after determining to hand over the terminal device to the target base station, the source base station sends, to an AMF network element, request information indicating that the terminal device needs to be handed over to the target base station, and when the AMF network element interacts with the target base station for confirmation and notifies the source base station to determine to agree to the handover, the source base station sends a handover command to the terminal device, to indicate the terminal device to be handed over to the target base station.

The SN mobility scenario may include a scenario in which an SN is added or changed in a primary secondary cell/a primary secondary base station triggered by a primary base station, and a scenario in which an SN is changed in a primary secondary cell/a primary secondary base station triggered by a secondary base station in the DC or MC scenario. In the DC or MC scenario, the primary base station (master node, MN) may provide an air interface resource for the terminal device by using a plurality of cells managed by the primary base station, and the plurality of cells managed by the MN may form a master cell group (MCG). The SN may provide an air interface resource for the terminal device by using a plurality of cells managed by the SN, and the plurality of cells managed by the SN may form a secondary cell group (SCG).

With an increasing type of a mobility report of the terminal device, for example, a success report/failure report in the handover scenario, a success report/failure report in the SN mobility scenario, or another mobility report, how to properly process a plurality of mobility reports needs to be considered to improve network mobility management performance. This application proposes that after the terminal device is successfully handed over to a target primary cell/target primary network device, or a primary secondary cell/primary secondary network device is successfully added or changed, the terminal device records first information in the handover scenario or the SN mobility scenario, and starts a timer. If a connection between the terminal device and a target network device (including the target primary network device, a target secondary network device, the target primary cell, or the primary secondary cell) fails during running of the timer, the terminal device deletes the first information, or the terminal device records second information related to a connection failure and deletes the first information. Optionally, the terminal device may send the second information. Alternatively, if no connection fails during the running of the timer, the terminal device reserves the first information. Alternatively, if the connection fails after the timer expires, the terminal device records the second information related to the connection failure. Optionally, the terminal device may send the first information and/or the second information. In this way, the terminal device can determine, by using the timer, whether the successfully established connection to the target network device is stable, so as to determine information to be provided for the network, so that the network optimizes a network configuration based on the information provided by the terminal device. This can reduce a probability of a mobility failure of the terminal device, and improve network mobility management performance, to improve network service quality.

It should be noted that the solutions in this application may be applied to the foregoing handover scenario, and may also be applied to a scenario in which the terminal device needs to change a connected network device or add a connected network device, for example, the SN mobility scenario. The following mainly uses the handover scenario as an example for description, but this application is not limited thereto. If the SN mobility scenario is applicable, a corresponding procedure may be properly transformed to match a signaling procedure in the SN mobility scenario.

FIG. 2 is a schematic flowchart of a communication method 200 according to an embodiment of this application.

S210: A terminal device records first information and starts a timer after the terminal device is successfully handed over from a first network device to a target network device.

The first information indicates that the terminal device is successfully handed over from the first network device to the target network device.

In an example, the terminal device starts the timer at a moment at which it is determined that the terminal device is successfully handed over from the first network device to the target network device, or at a moment at which the terminal device records the first information.

It may be understood that in this embodiment of this application, an example in which the terminal device is successfully handed over from a first cell served by the first network device to a second cell served by the target network device, and the first network device and the target network device are different network devices is used for description. The solution in this application is also applicable to a scenario in which the terminal device is successfully handed over from a first cell to a second cell, and both the first cell and the second cell may belong to the first network device, in other words, the first network device and the target network device are a same network device. In this scenario, a procedure of interaction between the first network device and the target network device may not be performed or may be understood as being implemented inside the network device.

For example, in a common handover scenario or a DAPS scenario, after receiving a handover command from the first network device, and initiating and completing a random access process with a target cell (namely, a cell managed by the target network device, for example, the second cell), or completing RRC connection reconfiguration with the target network device, the terminal device determines that the terminal device is successfully handed over to the target network device, records the first information, and starts the timer.

For another example, in a CHO scenario, after the terminal device initiates and completes a random access process with a target cell (for example, the second cell) that meets a handover condition, or the terminal device completes RRC connection reconfiguration with the target network device, the terminal device determines that the terminal device is successfully handed over to the target network device, records the first information, and starts the timer. Optionally, the moment at which the terminal device records the first information may be before or after a moment at which the terminal device sends a handover complete message to the target network device. This is not limited in this application.

Optionally, the first network device sends running duration of the timer to the terminal device. In other words, the running duration of the timer may be configured by the first network device.

Correspondingly, the terminal device receives the running duration of the timer from the first network device.

By way of example, and not limitation, the running duration of the timer is carried in a mobility command message (for example, an RRC reconfigurationmessage, an RRC connection reconfiguration message, a mobility from NR command, a mobility from E-UTRA command, or another message) sent by the first network device to the terminal device.

Optionally, the running duration of the timer is received by the first network device from the target network device or a core network device, and is forwarded to the terminal device.

For example, the first network device sends a handover request to the target network device through an Xn interface between the first network device and the target network device (where, to be specific, this handover is an Xn interface-based handover), and a handover request acknowledge message sent by the target network device to the first network device includes the running duration of the timer. The handover command sent by the first network device to the terminal device includes the running duration of the timer, but this application is not limited thereto.

For another example, the first network device sends, to the core network device through an NG interface, a request for handing over the terminal device to the target network device (where, to be specific, this handover is an NG interface-based handover), and the core network device then notifies the target network device that the first network device requests to hand over the terminal device to the target network device. The target network device may send a handover acknowledge message to the core network device. The message may include the running duration of the timer. After receiving the handover acknowledge message, the core network device sends a handover command message (namely, an NG interface message) to the first network device. The handover command message includes the running duration of the timer. After the first network device receives the handover command message, a mobility command (namely, an air interface message, where, for example, the mobility command may be carried in an RRC reconfiguration message) sent to the terminal device includes the running duration of the timer. It should be noted that the handover request of the first network device may be transferred to the target network device through one or more core network devices, and/or the handover acknowledge message and the running duration of the timer of the target network device may be transferred to the first network device through one or more core network devices. If a plurality of core network devices are passed through, signaling interaction between the plurality of core network devices may be further included. This is not limited in this application.

S220: During the running of the timer, the terminal device determines a processing manner of the first information depending on whether a connection between the terminal device and the target network device fails.

In a specific implementation, during the running of the timer, the terminal device determines the processing manner of the first information depending on whether a connection between the terminal device and the second cell served by the target network device fails.

It may be understood that in this embodiment of this application, an example in which the terminal device starts the timer is used for description. Alternatively, the terminal device may maintain a time length, and determine the processing manner of the first information depending on whether the connection between the terminal device and the target network device fails within the time length.

After the terminal device records the first information, for example, after the terminal device records and stores the first information, or before the terminal device sends the first information to the network device after recording the first information, the terminal device may determine, depending on whether the connection fails during the running of the timer, whether there is a failure risk after the successful handover, or whether the successful handover is stable, to determine the processing manner of the first information.

If the connection between the terminal device and the target network device fails during the running of the timer, the terminal device deletes the first information, or the terminal device records second information and deletes the first information. The second information indicates that the connection between the terminal device and the target network device fails. It should be noted that a sequence in which the terminal device records the second information and deletes the first information is not limited in this application.

It may be understood that, if the terminal device does not have a capability of recording the second information, the terminal device may only delete the first information if the connection between the terminal device and the target network device fails during the running of the timer. This embodiment of this application is described by using an example in which the terminal device has the capability of recording the second information, and is not limited to the scenario. This embodiment of this application through proper variations may be applied to a scenario in which the terminal device does not have the capability of recording the second information, for example, the terminal device does not perform steps related to the second information in this embodiment of this application.

According to this solution, if the connection between the terminal device and the target network device fails during the running of the timer, it may be considered that the connection established between the terminal device and the target network device is unstable, in other words, it may be considered that an entire handover event is actually an unsuccessful handover event or a failed handover event. The terminal device may delete the first information indicating the successful handover. When the terminal device has the capability of recording the second information (namely, information indicating that a connection failure), the terminal device records the second information. Optionally, the terminal device may send the second information in S230. For example, if the terminal device does not report the second information within specified time (for example, 24 hours, 48 hours, or another time) after recording the second information, the terminal device may delete the recorded second information, in other words, the terminal device does not need to perform step S230. In this solution, by determining whether the entire handover event is successful, information recorded by the terminal device can be reduced, and air interface signaling overheads caused by reporting the recorded information by the terminal device can be reduced. In addition, a probability that the network device performs inaccurate configuration optimization based on the first information can be further avoided.

It may be understood that if the terminal device is handed over from the second cell to another cell during the running of the timer, the terminal device stops the timer.

Optionally, the terminal device records associated event indication information in the second information. The associated event indication information indicates that the first information has been recorded in a mobility event corresponding to the second information, or indicates that the connection between the terminal device and the target network device has been successfully established. In this way, after obtaining the second information in S230, the first network device may determine, based on the associated event indication information, that the connection between the terminal device and the target network device has been successfully established, but the connection fails during the running of the timer. In this solution, a degree to which the first network device can determine or adjust a mobility management parameter with reference to a failure that occurs after the terminal device is successfully handed over may be different from a degree of determining or adjusting the mobility management parameter based on a case in which the handover fails. In this way, a network configuration can be optimized more accurately, and a probability of a mobility failure of the terminal device can be reduced.

The degree to which the first network device adjusts the mobility management parameter may be a degree to which the first network device adjusts a reported threshold triggered when the terminal device measures service quality of a neighboring cell. For example, a degree to which the first network device increases the threshold (for example, increases the threshold by a value P) when the failure occurs after the terminal device is successfully handed over is less than a degree to which the first network device increases the threshold (for example, increases the threshold by a value Q, where Q>P) when the handover of the terminal device fails. However, this application is not limited thereto.

During the running of the timer (or before the timer expires), if no connection between the terminal device and the target network device fails, optionally, the terminal device sends the first information in S230.

According to this solution, during the running of the timer or before the timer expires, if no connection between the terminal device and the target network device fails, it may be considered that it is stable for the terminal device to be successfully handed over to the target network device. Optionally, the terminal device sends the first information in S230.

Optionally, if the connection between the terminal device and the target network device fails during the running of the timer, the terminal device stops the timer. It should be noted that a sequence in which the terminal device records the second information, deletes the first information, and stops the timer is not limited in this application. In an example, the terminal device may stop the timer, delete the first information, and record the second information. Alternatively, if the terminal device enters a non-connected state based on configuration information of the target network device, the terminal device may stop the timer.

Optionally, in S230, the terminal device sends the first information or the second information.

The terminal device determines, depending on whether the connection between the terminal device and the target network device fails during the running of the timer in S220, to record the first information or the second information. Correspondingly, the terminal device sends the first information or the second information.

If no connection between the terminal device and the target network device fails during the running of the timer, the terminal device records the first information indicating the successful handover. Correspondingly, the terminal device sends the first information.

Optionally, the first information includes but is not limited to, one or more of the following information: indication information A, used to determine a moment at which the terminal device receives the mobility command or a moment at which the terminal device determines to trigger a conditional handover; identifier information of a first cell, where the first cell is a serving cell that is of the terminal device before the handover and that is managed by the first network device; and first identifier information of the terminal device, where the first identifier information is identifier information of the terminal device in the first cell.

For example, the indication information A may include a time interval between the terminal device receiving the mobility command (for example, the handover command sent by the first network device, or a command of adding or changing an SN, but this application is not limited thereto)

and the first information being sent, or a time interval between the terminal device determining to trigger the conditional handover (for example, after the terminal device receives a conditional handover command sent by the first network device, when a condition is met, the terminal device triggering the handover) and the first information being sent. However, this application is not limited thereto.

Optionally, the moment at which the terminal device receives the mobility command may be a moment at which the terminal device receives the mobility command for the last time.

It should be understood that, when the handover of the terminal device from the first network device to the target network device is triggered by using the conditional handover, in a specific implementation, the indication information A may be used to determine the moment at which the terminal device triggers the conditional handover.

For example, the handover of the terminal device from the first network device to the target network device is triggered by using conditional handover. In other words, after the terminal device receives the conditional handover command, when the handover condition is met, the terminal device triggers the conditional handover from the first network device to the target network device. The indication information A may be a time interval between the terminal device determining to trigger the conditional handover and the first information being sent. However, this application is not limited thereto.

Optionally, the indication information A is used to determine the moment (time point) at which the terminal device receives the mobility command or the moment at which the terminal device determines to trigger the conditional handover. The indication information A includes a time interval T3 and a time interval T4. The time interval T3 is a time interval between the terminal device receiving the mobility command and the terminal device being successfully handed over to the target network device, or a time interval between the terminal device determining to trigger the conditional handover and the terminal device being successfully handed over to the target network device. The time interval T4 is a time interval between the terminal device being successfully handed over to the target network device and the first information being sent.

For example, the first identifier information may be a cell radio network temporary identifier (C-RNTI) of the terminal device in the first cell. However, this application is not limited thereto.

For example, the identifier information of the first cell is a cell identifier of the first cell.

By way of example, and not limitation, the cell identifier may be at least one of the following identifiers: a cell global identifier (CGI) of the cell, a physical cell identifier (PCI) and a frequency, a cell identifier (cell ID), a non-public network identifier (NPN ID), a non-terrestrial network identifier (NTN ID), or another cell identifier.

The CGI may include a public land mobile network identifier (PLMN ID) and a cell ID.

Optionally, the cell identifier may be a cell identifier corresponding to a cell accessed by the terminal device, or may be a cell identifier of a first cell in information about at least one cell sent by the cell accessed by the terminal device. For example, if the cell accessed by the terminal device sends PLMN1+ cell ID 1+TAC1 and PLMN2+ cell ID2+TAC2, and the cell accessed by the terminal device is PLMN2+ cell ID2+TAC2, the cell identifier recorded by the terminal device may be PLMN ID1+ cell ID1+TAC1, and/or PLMN ID2+ cell ID2+TAC2.

Optionally, the cell identifier may further include a tracking area code (TAC) and/or identifier information of a network device to which the cell belongs, for example, a global network device identifier.

If the connection between the terminal device and the target network device fails during the running of the timer, the terminal device determines to record the second information indicating the connection failure.

Optionally, the second information may include but is not limited to one or more of the following: identifier information of the second cell (for example, written as failedCellId), a connection failure type (for example, written as connectionFailureType), indication information B, the associated event indication information, the identifier information of the first cell, or the first identifier information of the terminal device. The first identifier information of the terminal device is identifier information of the terminal device in the first cell.

For example, the connection failure type includes a radio link failure (RLF) or a handover failure (HOF), but this application is not limited thereto.

For example, the identifier information of the second cell is one of the foregoing cell identifiers.

The indication information B is used to determine the moment at which the terminal device receives the mobility command for the last time or the moment at which the terminal device determines to trigger the conditional handover. For example, the indication information B includes a time interval T1 and a time interval T2. The time interval T1 is a time interval between the terminal device receiving the mobility command for the last time or the terminal device determining to trigger the conditional handover and the connection between the terminal device and the target network device failing. The time interval T2 is a time interval between the connection between the terminal device and the target network device failing and the second information being sent.

It should be understood that, when the handover of the terminal device from the first network device to the target network device is triggered by using the conditional handover, in a specific implementation, the indication information B may be used to determine the moment at which the terminal device triggers the conditional handover.

Optionally, the terminal device may send the first information or the second information to the first network device, the target network device, or a second network device.

It may be understood that in this embodiment of this application, the first information/second information sent by the terminal device may have same content as the first information/second information recorded by the terminal device, or is determined based on the first information/second information recorded by the terminal device. Alternatively, the first information/second information sent by the terminal device may be all or a part of content of the first information/second information recorded by the terminal device. In this embodiment of this application, the first information/second information is uniformly described only from a perspective of a function, and the first information/second information sent by the terminal device and the first information/second information recorded by the terminal device are not distinguished from each other.

Optionally, the first information is carried in a mobility success report or a successful mobility report sent by the terminal device, and/or the second information is carried in a failure report (for example, a radio link failure report (RLF report)) sent by the terminal device.

Figure 3:
FIG. 3 is another schematic flowchart of a communication method according to an embodiment of this application.
Figure 3:
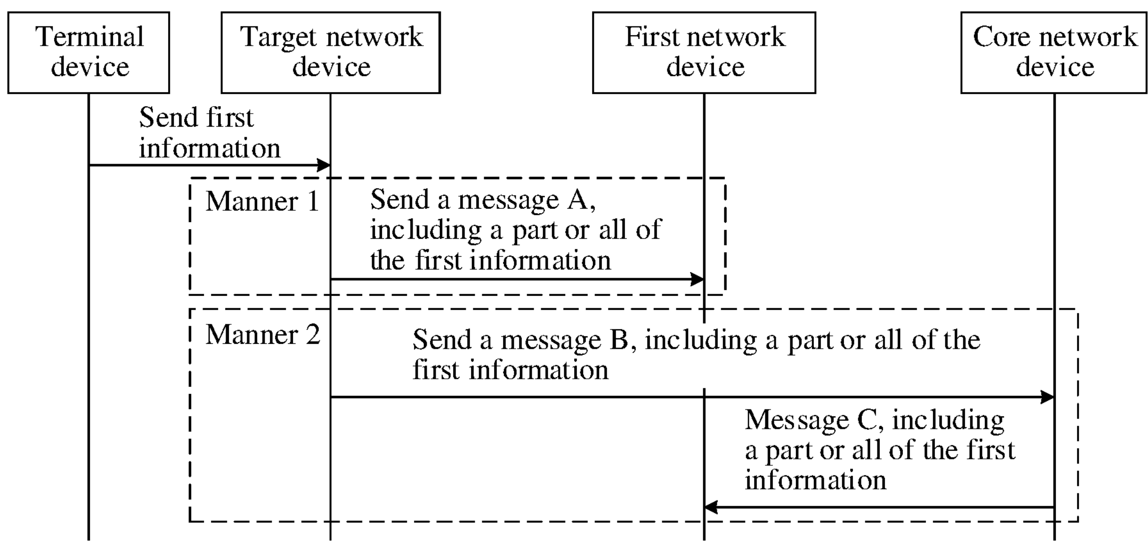

For example, if no connection between the terminal device and the target network device fails during the running of the timer, the terminal device determines to send the first information indicating the successful handover. After the terminal device is successfully handed over to the target network device, for example, as shown in FIG. 3, the terminal device may send the first information to the target network device. After receiving the first information, the target network device may determine, based on the identifier information of the first cell in the first information, the first network device that manages the first cell. The target network device may transfer a part or all of the first information to the first network device in Manner 1 or Manner 2 shown in FIG. 3. For example, Manner 1 may be applied to a case in which a communication interface (for example, an Xn interface or an X2 interface) is established between the target network device and the first network device. The target network device may send a message A to the first network device through the Xn interface. The message A includes a part of content or all of the first information. For example, in the message A, the target network device sends a part of the first information to the first network device. For example, after the target network device determines the first network device based on the identifier information of the first cell, the part of content in the first information sent by the target network device to the first network device does not include the identifier information of the first cell. However, this application is not limited thereto. By way of example, and not limitation, the message A is a handover report (HANDOVER REPORT), a UE context release (UE CONTEXT RELEASE), or an access and mobility (ACCESS AND MOBILITY) indication sent by the target network device to the first network device.

For example, Manner 2 shown in FIG. 3 may be applied to a case in which no communication interface is established between the target network device and the first network device, and the target network device may forward a part or all of the first information to the first network device via the core network device. For example, the target network device sends a message B to the core network device through a communication interface (for example, an S1 interface or an NG interface) between the target network device and the core network device. The message B includes a part or all of the first information. The core network device then sends a message C to the first network device through a communication interface (for example, an S1 interface or an NG interface) between the core network device and the first network device. The message C includes a part or all of the first information. However, this application is not limited thereto.

By way of example, and not limitation, the message B is at least one of the following messages sent by the target network device to the core network device: an uplink RAN configuration transfer (UPLINK RAN CONFIGURATION TRANSFER) message, an eNB configuration transfer (eNB CONFIGURATION TRANSFER) message, or another message.

By way of example, and not limitation, the message C is at least one of the following messages sent by the core network device to the first network device: a downlink RAN configuration transfer (DOWNLINK RAN CONFIGURATION TRANSFER) message, an MME configuration transfer (MME CONFIGURATION TRANSFER) message, or another message.

After receiving the part or all of the first information, the first network device may determine, based on the first information, that the connection between the terminal device and the target network device is successfully established, and determine a mobility management parameter of the first network device based on the first information. In other words, the first information is considered when the first network device optimizes the mobility management parameter by collecting statistics on a link failure, a handover failure, and mobility-related information provided by a plurality of terminal devices. This solution can improve the network mobility management performance.

For example, the first network device may determine, based on the first identifier information that is of the terminal device in the first cell and that is in the first information, for example, the C-RNTI of the terminal device in the first cell, a terminal device corresponding to the first information, and determine, based on the indication information A in the first information, a moment at which the terminal device receives the handover command or a moment at which the terminal device triggers the conditional handover, to determine a handover event of the terminal device. However, this application is not limited thereto.

For another example, if no connection between the terminal device and the target network device fails during the running of the timer, the terminal device determines to send the first information indicating the successful handover. If a connection is established between the terminal device and the first network device, the terminal device may send the first information to the first network device; or if a connection is established between the terminal device and the second network device, the terminal device may send the first information to the second network device. The second network device may send a part or all of the first information to the first network device through a communication interface between the second network device and the first network device. Alternatively, the second network device forwards a part or all of the first information to the first network device via the core network device. Specifically, this manner is similar to a manner in which the target network device transfers the part or all of the information of the first information to the first network device. For details, refer to the foregoing related descriptions. For brevity, details are not described herein again.

For another example, if the connection between the terminal device and the target network device fails during the running of the timer, the terminal device determines to send the second information indicating the connection failure. After the connection between the terminal device and the target network device fails, the terminal device may initiate a re-establishment procedure or a re-access procedure. The terminal device may send the second information to a network device that establishes a connection. For example, the network device that establishes the connection to the terminal device may be the first network device, and the terminal device may send the second information to the first network device. Alternatively, the network device that establishes the connection to the terminal device may be the target network device. The terminal device may send the second information to the target network device, and the target network device sends a part or all of the second information to the first network device. For a specific manner in which the target network device transfers the part or all of the second information to the first network device, refer to the manner in which the target network device transfers the part or all of the first information to the first network device. For brevity, details are not described herein again.

Figure 4:
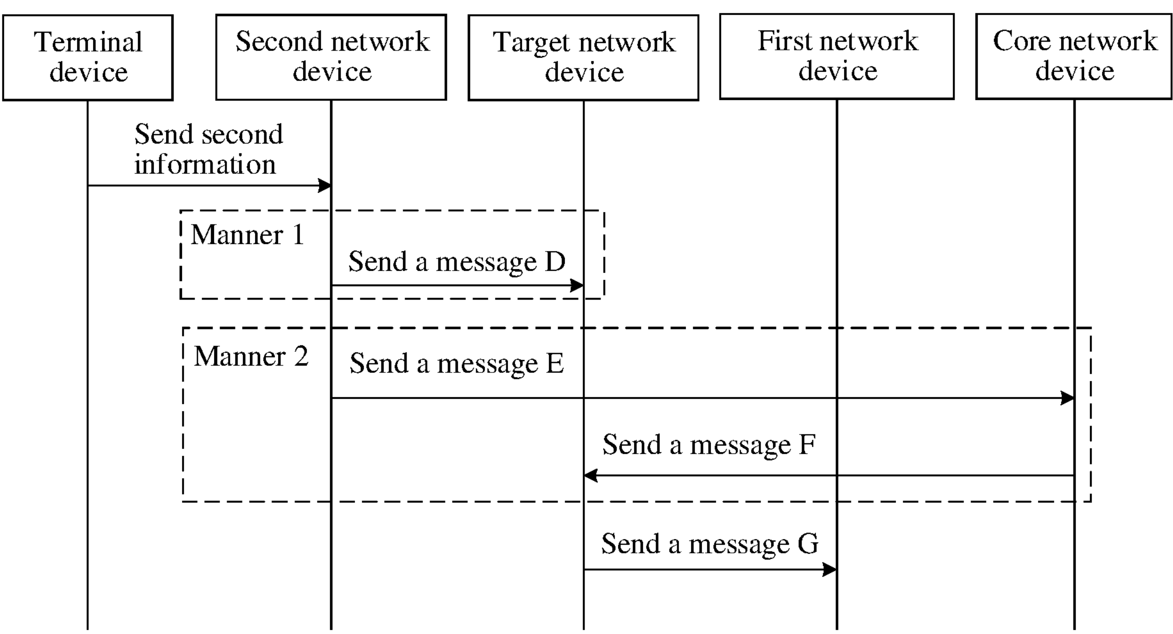
FIG. 4 is another schematic flowchart of a communication method according to an embodiment of this application.

For another example, the network device that establishes the connection to the terminal device may be the second network device. For example, as shown in FIG. 4, the terminal device may send the second information to the second network device. After receiving the second information, the second network device may determine, based on the identifier information of the second cell in the second information, the second cell in which a failure occurs and the target network device. The second network device may transfer a part or all of the second information to the target network device in Manner 1 and Manner 2 shown in FIG. 4. For example, in Manner 1, the second network device may send a message D to the target network device through a communication interface between the second network device and the target network device, and the message D includes the part or all of the second information. By way of example, and not limitation, the message D is a failure indication (failure indication) sent by the second network device to the target network device. However, this application is not limited thereto.

For example, in Manner 2 shown in FIG. 4, the second network device may send a message E to the core network device through a communication interface between the second network device and the core network device, and the message E includes a part or all of the second information. By way of example, and not limitation, the message E is a self-organizing network (SON) information report sent by the second network device to the core network device, and may be written as an SON info report. After receiving a message F, the core network device may send the message F to the target network device. The message F includes a part or all of the second information. However, this application is not limited thereto.

After receiving the part or all of the second information, the target network device may analyze a reason for the connection failure based on the second information, and optimize a network parameter configuration and/or a mobility management parameter of the target network device. In addition, the target network device determines, based on the identifier information of the first cell in the second information, that the terminal device is handed over from the first network device to the target network device, or determines, based on information stored in the target network device, that the terminal device is handed over from the first network device to the target network device. The target network device sends a message G to the first network device, and the message G includes a part or all of the second information. However, this application is not limited thereto.

After receiving the part or all of the second information, the first network device may determine that a connection failure occurs when the terminal device is handed over to the target network device, and determine a mobility management parameter of the first network device based on the second information. For example, the first information is considered when the first network device optimizes the mobility management parameter by collecting statistics on a link failure, a handover failure, and mobility-related information provided by a plurality of terminal devices. This solution can improve the network mobility management performance. Optionally, the second information includes associated event indication information. The associated event indication information indicates that the terminal device has recorded the first information in a handover event corresponding to the second information or indicates that the connection between the terminal device and the target network device has been successfully established. The first network device may determine, based on the associated event indication information, a degree of adjusting the mobility management parameter, for example, different from a degree of adjusting the mobility management parameter when the handover fails because the connection between the terminal device and the target network device fails to be established. However, this application is not limited thereto.

Optionally, the network device that receives the first information or the second information includes a CU node and a DU node. Specifically, the CU node in the network device may receive the first information or the second information from the terminal device. Optionally, the CU node may send the first information (a part or all) or the second information (a part or all) to the DU node of the network device. Optionally, the CU node may be classified into a control plane (CU-CP) and a user plane (CU-UP). The CU-CP node may receive the first information or the second information from the terminal device, and the CU-CP sends the first information (a part or all) or the second information (a part or all) to the CU-UP node.

According to the foregoing solution, after the terminal device records the first information, for example, after the terminal device records and stores the first information, or before the terminal device sends the first information to the network device after recording the first information, the terminal device may determine, depending on whether the connection fails during the running of the timer, whether there is a failure risk after the successful handover, or whether the successful handover is stable, to determine the processing manner of the first information. By determining whether the entire handover event is successful, information recorded by the terminal device can be reduced, and air interface signaling overheads caused by reporting the recorded information by the terminal device can be reduced. In addition, a probability that the network device performs inaccurate configuration optimization based on the first information can be further avoided. The first network device may determine a mobility management parameter of the first network device based on the obtained first information (a part or all) or second information (a part or all). This solution can improve network mobility management performance, and improve network communication service quality. In addition, a case in which the first network device improperly adjusts the mobility management parameter can be avoided because the first network device adjusts the mobility management parameter based on a plurality of pieces of mobility information (for example, the first information and the second information) at a same handover time point.

It should be noted that the embodiment shown in FIG. 2 may be further applied to another mobility scenario, for example, an SN mobility scenario (for example, a mobility scenario in which an SN is added or changed). The first information may indicate that the SN is successfully added or changed. The second information may indicate that a connection between the terminal device and the successfully added SN or the successfully changed SN fails. After the terminal device sends the first information or the second information, the network device that receives the first information or the second information may send the first information (a part or all) or the second information (a part or all) to a primary network device MN connected to the terminal device. Optionally, SN mobility is triggered by a source (secondary) network device (namely, a source SN), and the master network device MN may forward the received first information (a part or all) or the received second information (a part or all) to the source (secondary) network device. Alternatively, the network device that receives the first information or the second information may send the first information (a part or all) or the second information (a part or all) to the source (secondary) network device. For a specific sending mechanism, refer to other descriptions in this embodiment of this application. Details are not described herein again.

Optionally, based on different application scenarios, the first information may be carried in a successful handover report, a CHO successful handover report, a DAPS successful handover report, an SCG successful mobility report, or another report sent by the terminal device.

Optionally, based on different application scenarios, the second information may be carried in a link failure report, an SCG mobility report, SCG failure information, or another failure report.

In another embodiment of the communication method provided in this application, S210 shown in FIG. 2 may be replaced with a step in which a terminal device starts a timer after receiving a mobility command or determining to trigger a conditional handover. The terminal device records first information after the terminal device is successfully handed over from a first network device to a target network device. If the connection between the terminal device and the target network device fails during the running of the timer, when the terminal device has recorded the first information, the terminal device deletes the first information. During the running of the timer, no connection between the terminal device and the target network device fails, and after the terminal device is successfully handed over from the first network device to the target network device, the terminal device may send the first information. For a part in this embodiment the same as or similar to that in the embodiment shown in FIG. 2, refer to the foregoing descriptions in the embodiment shown in FIG. 2. For brevity, details are not described herein again.

Based on the foregoing descriptions, after the terminal device is successfully handed over to the target network device, or receiving the mobility command or determining to trigger the conditional handover, the terminal device starts the timer, determines, depending on whether the connection fails to be established during the running of the timer, whether to delete the first information recording the successful handover, and reports the first information or the second information to the network device. In this way, the source network device (namely, the first network device) can properly adjust a mobility management parameter after receiving the first information or the second information.

In a scenario in which the terminal device is successfully handed over from the first network device to the target network device, if determining that the terminal device is successfully handed over to the target network device, or if receiving indication information that is sent by the terminal device and that stores the first information, the target network device may start a network device timer (which may also be referred to as a first timer). During the running of the first timer, the target network device does not request the first information from the terminal device. In other words, during the running of the first timer, the target network device does not send, to the terminal device, a message or information used to request the terminal device to send the first information to the target network device. When the first timer expires, it means that the connection between the target network device and the terminal device exists or succeeds, and the target network device may request the first information from the terminal device.

Optionally, during the running of the first timer, if the target network device hands over the terminal device to another network device, or the target network device configures the terminal device to enter a non-connected mode, or the target network device detects that a connection to the terminal device fails, the running of the first timer may be stopped.

According to the foregoing technical solution, the target network device determines, depending on whether the connection fails during the running of the first timer, whether there is a failure risk after the successful handover of the terminal device, or whether the successful handover is stable, so as to avoid requesting the first information from the terminal device when there is a failure risk after the successful handover or the successful handover is unstable.

Figures 5, 6:
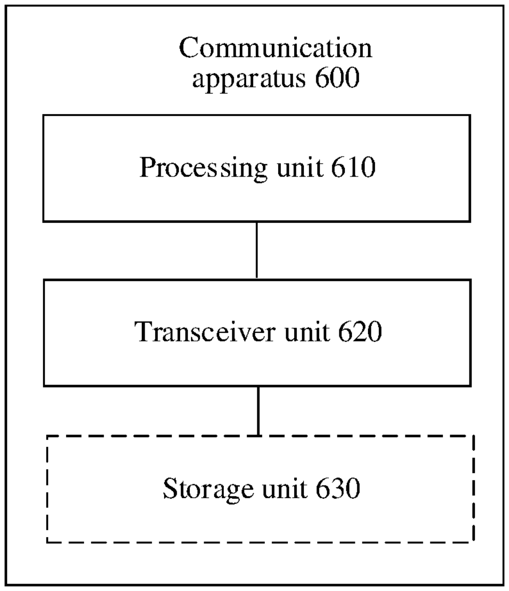
FIG. 5 is another schematic flowchart of a communication method according to an embodiment of this application.
FIG. 6 is a schematic block diagram of an example of a communication apparatus according to this application.

It may be understood that the foregoing solution in which the target network device starts and maintains the first timer may be combined with the embodiment shown in FIG. 2, or may be implemented independently. In other words, both the terminal device and the target network device may start a timing mechanism after the terminal device is successfully handed over to the target network device, or one of the terminal device and the target network device may start the timing mechanism. With reference to FIG. 5, the following describes another embodiment of a communication method according to this application. In the embodiment shown in FIG. 5, a terminal device may report first information recording a success and second information recording a connection failure. After the first information and the second information are transferred to a source network device, the source network device establishes an association between the first information and the second information based on first indication information in the second information, so as to properly adjust a mobility management parameter.

FIG. 5 is another schematic flowchart of a communication method according to an embodiment of this application.

S510: The terminal device records the first information after determining that the terminal device is successfully handed over from a first network device to a target network device.

The first information indicates that the terminal device is successfully handed over from the first network device to the target network device.

Optionally, the terminal device starts a timer after determining that the terminal device is successfully handed over from the first network device to the target network device.

It may be understood that in this embodiment of this application, an example in which the terminal device is successfully handed over from a first cell served by the first network device to a second cell served by the target network device, and the first network device and the target network device are different network devices is used for description. The solution in this application is also applicable to a scenario in which the terminal device is successfully handed over from a first cell to a second cell, and both the first cell and the second cell may belong to the first network device, in other words, the first network device and the target network device are a same network device. In this scenario, a procedure of interaction between the first network device and the target network device may not be performed or may be understood as being implemented inside the network device.

In an example, the terminal device starts the timer at a moment at which it is determined that the terminal device is successfully handed over from the first network device to the target network device, or at a moment at which the terminal device records the first information.

The timer is used by the terminal device to determine whether a connection between the terminal device and the target network device fails in a mobility event corresponding to the first information during running of the timer.

By way of example, and not limitation, the first information includes one or more of the following: indication information A, identifier information of the first cell, or first identifier information of the terminal device.

The indication information A is used to determine a moment at which the terminal device receives a mobility command or a moment at which the terminal device determines to trigger a conditional handover.

For content included in the first information, refer to descriptions of the first information in the embodiment shown in FIG. 2. For brevity, details are not described herein again.

For descriptions of the foregoing timer, refer to descriptions of the timer in the embodiment shown in FIG. 2. Details are not described herein again.

S520: The terminal device records second information when determining that the connection between the terminal device and the target network device fails.

The second information indicates that the connection between the terminal device and the target network device fails. The second information includes indication information B, and the indication information B is used to determine a moment at which the terminal device receives the mobility command for the last time or the moment at which the terminal device triggers the conditional handover. By way of example, and not limitation, the second information may include one or more of the following: identifier information of the second cell (for example, written as failedCellId), a connection failure type (for example, written as connectionFailureType), the indication information B, the identifier information of the first cell, or the first identifier information of the terminal device. For content included in the second information, refer to descriptions of the second information in the embodiment shown in FIG. 2. For brevity, details are not described herein again.

Optionally, in S510, the terminal device starts the timer after determining that the terminal device is successfully handed over from the first network device to the target network device. During the running of the timer, when the connection between the terminal device and the target network device fails, the second information recorded by the terminal device includes second associated event indication information. The second associated event indication information indicates that the first information has been recorded or reported in a mobility event corresponding to the second information, or the second associated event indication information indicates that the connection between the terminal device and the target network device has been successfully established in the mobility event corresponding to the second information.

Optionally, the terminal device records first associated event indication information in the first information, where the first associated event indication information indicates that the second information has been recorded in the mobility event corresponding to the first information, and/or the first associated event indication information indicates that the connection between the terminal device and the target network device fails during the running of the timer.

For example, after the terminal device records the first information, after the terminal device records and stores the first information, or before the terminal device sends the first information to the network device after recording the first information, when the connection between the terminal device and the target network device fails during the running of the timer, the terminal device may update the first information, and record or update, in the first information, the associated event indication information to information indicating a connection failure in the mobility event corresponding to the first information. However, this application is not limited thereto.

Optionally, in S530, the terminal device sends the first information and/or the second information.

The terminal device may separately send the first information and the second information to different network devices, or may send the first information and the second information to a same network device. S530 may include the following implementations.

Manner 1: That the terminal device sends the first information may be performed after S510, and that the terminal device sends the second information may be performed after S520. In other words, the terminal device sends the first information to the target network device after the terminal device is successfully handed over to the target network device, or the terminal device sends the first information to the target network device after recording the first information. If a failure occurs between the terminal device and the target network device, a connection between the terminal device and the first network device/the target network device/a second network device may be established, and the terminal device may send the second information to the network device that establishes the connection to the terminal device.

Optionally, after receiving the first information of the terminal device, the target network device may transfer the first information to the first network device before the first network device releases a context of the terminal device.

For example, when the handover of the terminal device is an Xn-based handover, before sending a UE context release message to the first network device, the target network device may send the first information to the first network device by using a UE associated Xn interface message between the target network device and the first network device, or the first information is carried in the UE context release message. However, this application is not limited thereto. The message that carries the first information and that is sent by the target network device to the first network device includes identifier information of the terminal device in the first network device, for example, a source next generation-RAN node UE Xn application protocol (AP) identifier, which may be written as a source NG-RAN node UE XnAP ID. The first network device may determine, based on the source NG-RAN node UE XnAP ID, context information of the terminal device in the first network device, for example, the identifier information (for example, a cell identifier) of the first cell, and the first identifier information (for example, a C-RNTI) of the terminal device. Alternatively, the first network device may determine, based on the identifier information of the first cell in the first information and the first identifier information of the terminal device, that the first information is from the terminal device, and determine, based on the first information, that the terminal device is successfully handed over to the target network device. However, this application is not limited thereto.

For another example, when the handover of the terminal device is an NG-based handover, the target network device may send the first information before sending a handover notify (handover notify) message to a core network device. Alternatively, the first information is carried in a handover notify message, and a core network device forwards the handover notify message to the first network device. For example, the core network device may send the first information to the first network device before sending a UE context release message to the first network device. Alternatively, the first information is carried in a UE context release message sent by the core network device to the first network device. This is not limited in this application.

Optionally, the terminal device may send the second information to the first network device, the target network device, or the second network device.

For a specific implementation, refer to descriptions in the embodiment shown in FIG. 2. For brevity, details are not described herein again.

Manner 2: After recording the first information and/or the second information for a period of time, the terminal device sends the first information and/or the second information to a network device that currently establishes a connection to the terminal device.

For example, the terminal device does not immediately send the first information and/or the second information after recording the first information and/or the second information. For example, the terminal device may predefine or preconfigure a moment of sending the first information and/or the second information, for example, send the first information and/or the second information after the connection between the terminal device and the network device is established. However, this application is not limited thereto.

Optionally, the terminal device may send the first information to the first network device, the target network device, or the second network device; and/or the terminal device may send the second information to the first network device, the target network device, or the second network device.

For a specific implementation, refer to descriptions in the embodiment shown in FIG. 2. For brevity, details are not described herein again.

Optionally, the network device that receives the first information and/or the second information includes a CU node and a DU node. Specifically, the CU node in the network device may receive the first information and/or the second information from the terminal device. Optionally, the CU node may send the first information and/or the second information to the DU node of the network device. Optionally, the CU node may be classified into a control plane (CU-CP) and a user plane (CU-UP). The CU-CP node may receive the first information and/or the second information from the terminal device, and the CU-CP sends the first information and/or the second information to the CU-UP node.

In an SN mobility scenario, the first information and/or the second information may be transferred, via the target network device, the second network device, or the core network device, to an MN connected to the terminal device in the SN mobility scenario. If SN mobility is triggered by the MN, the MN further determines and adjusts a mobility management parameter. If the SN mobility is triggered by an SN, after the MN receives the first information and/or the second information, the MN sends the first information and/or the second information to a source SN that triggers the SN mobility, and the source SN further determines and adjusts a mobility management parameter.

It should be noted that information that is in the first information and/or the second information and that is transferred to the first network device via the target network device, the second network device, or the core network device may be a part or all of the first information and/or the second information. This is not limited in this application.

After receiving the part or all of the second information, the first network device may determine, based on the indication information B in the second information, that the first information and the second information are information in a same handover event.

After obtaining the second information (a part or all), the first network device determines, based on the indication information B in the second information, a moment at which the terminal device receives a handover command, or a moment at which the terminal device triggers the conditional handover.

In an example, if the first network device receives the first information before UE context release, the first network device may determine, based on the UE context information, a moment at which the first network device sends the handover command to the terminal device corresponding to the first information. If the moment at which the indication information B indicates that the handover command is received is the same as the moment at which the network device corresponding to the first information sends the handover command, the first network device may determine that the first information and the second information are information in a same handover event, and establish an association between the first information and the second information. Optionally, the first network device may further determine that the first identifier information of the terminal device, and the identifier information of the cell in the first information are the same as these in the second information, to determine that the second information and the previously received first information are related information of a same terminal device in a same handover event, and establish the association between the first information and the second information.

In another example, the first information may include the indication information A. After receiving the first information, the first network device may determine, based on the indication information A, the moment at which the terminal device receives the handover command (or the moment at which the conditional handover is triggered). If determining that the moment at which the terminal device receives the handover command (or the moment at which the conditional handover is triggered) indicated by the second information is the same as the moment at which the terminal device receives the handover command (or the moment at which the conditional handover is triggered) indicated by the first information, the first network device may establish an association between the first information and the second information. Optionally, the first network device may further determine that the first identifier information of the terminal device, and the identifier information of the cell in the first information are the same as these in the second information, to determine that the second information and the previously received first information are related information of a same terminal device in a same handover event, and establish the association between the first information and the second information.

Optionally, the first network device determines a mobility management parameter of the first network device based on the first information and/or the second information.

In an example, the first network device determines that the connection between the terminal device and the target network device fails within a first time interval after the terminal device receives the mobility command or triggers the conditional handover, or within a second time interval after the terminal device is successfully handed over to the target network device. The first network device determines the mobility management parameter of the first network device based on the second information, or determines the mobility management parameter of the first network device based on the first information and the second information.

For example, the first network device may determine, based on the indication information B in the second information, a time point at which the connection between the terminal device and the target network device fails, and may determine whether the time point is within the first time interval after the terminal device receives the mobility command or triggers the conditional handover. If the time point is within the first time interval after the terminal device receives the mobility command or triggers the conditional handover, the first network device may consider that the successful handover of the terminal device to the target network device is unstable, and may consider that the handover is unsuccessful. In this way, the first network device may determine or adjust the mobility management parameter of the first network device based on the second information. Alternatively, the first network device may determine or adjust the mobility management parameter of the first network device based on the first information and the second information. For example, a degree to which the first network device adjusts the mobility management parameter with reference to a failure that occurs after the terminal device is successfully handed over may be different from a degree of adjusting the mobility management parameter based on a case in which the handover fails. However, this application is not limited thereto. In this solution, the first network device can perform mobility management more accurately, network mobility management performance can be improved, and network communication service quality is improved.

In another example, the first network device determines that the connection between the terminal device and the target network device fails after a first time interval after the terminal device receives the mobility command or triggers the conditional handover, or after a second time interval after the terminal device is handed over to the target network device. The first network device determines the mobility management parameter of the first network device based on the first information.

For example, the first network device may determine, based on the indication information A in the first information, for example, a time interval T4, a moment at which the terminal device is successfully handed over to the target network device, and determine, based on the indication information B in the second information, a moment at which the connection between the terminal device and the target network device fails, to determine whether the moment at which the connection fails is within the second time interval at which the terminal device is successfully handed over to the target network device. If the moment is after the second time interval after the terminal device receives the mobility command or triggers the conditional handover, the first network device may determine or adjust the mobility management parameter of the first network device based on the first information. Because the current failure occurs after a threshold of the unstable successful handover, the first network device may consider that the terminal device is successfully handed over to the target network device, and may consider that the current connection failure is not a case of the unstable handover, or the failure of the connection between the terminal device and the target network device may be a problem of the connection between the terminal device and the target network device. Therefore, the first network device may determine the mobility management parameter based on only the first information. However, this application is not limited thereto. In this solution, the first network device can perform mobility management more accurately, network mobility management performance can be improved, and network communication service quality is improved.

Optionally, the first network device may determine, depending on whether the second information includes the second associated event indication information, the mobility management parameter of the first network device based on the first information and/or the second information.

For example, after receiving the first information and the second information, the first network device may determine whether the second information includes the second associated event indication information. If the second information includes the second associated event indication information, it means that the connection failure corresponding to the second information occurs during the running of the timer after the terminal device is successfully handed over to the target network device. If no connection between the devices fails, the first network device may consider that the successful handover of the terminal device to the target network device is unstable, and may consider that the current connection failure is not a case of the unstable handover. The first network device may determine or adjust the mobility management parameter of the first network device based on the second information. Alternatively, the first network device may determine or adjust the mobility management parameter of the first network device based on the first information and the second information. For example, a degree to which the first network device adjusts the mobility management parameter with reference to a failure that occurs after the terminal device is successfully handed over may be different from a degree of adjusting the mobility management parameter based on a case in which the handover fails. In this way, the first network device can perform mobility management more accurately, network mobility management performance can be improved, and network communication service quality is improved. If the second associated event indication information is not included, it indicates that the connection failure corresponding to the second information does not occur during the running of the timer. The first network device determines the mobility management parameter of the first network device based on the first information. The first network device may consider that the successful handover of the terminal device to the target network device is stable, and the first network device may determine the mobility management parameter based on only the first information. However, this application is not limited thereto. In this solution, the first network device can perform mobility management more accurately, network mobility management performance can be improved, and network communication service quality is improved.

Optionally, the first network device may further determine, depending on whether the first information includes the first associated event indication information, the mobility management parameter of the first network device based on the first information and/or the second information.

For example, when the first information is not immediately sent by after being recorded, and the terminal device determines that the connection between the terminal device and the target network device fails during the running of the timer, the terminal device records the first associated event indication information in the first information, to indicate that the second information has been recorded or reported in the handover event corresponding to the first information, and/or indicate that the connection between the terminal device and the target network device fails during the running of the timer. However, this application is not limited thereto.

According to the foregoing solution, the network device may determine, based on the moment of the connection failure corresponding to the second information, whether the second information is related to the handover of the terminal device, and in a related case, optimize the mobility management parameter based on the second information or based on the first information and the second information. Alternatively, the terminal device may determine by using the timer that the successful handover is unstable, and record association indication information in the first information and/or the second information. In this way, the network device can establish an association, and obtain a status of the terminal device after the handover more accurately, so that the network device can perform mobility management more accurately, network mobility management performance can be improved, and network communication service quality is improved.

The methods provided in embodiments of this application are described above in detail with reference to FIG. 2 to FIG. 5. Apparatuses provided in embodiments of this application are described below in detail with reference to FIG. 6 to FIG. 8. To implement functions in the methods provided in the foregoing embodiments of this application, each network element may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraint conditions of the technical solutions.

FIG. 6 is a schematic block diagram of a communication apparatus according to an embodiment of this application. As shown in FIG. 6, a communication apparatus 600 may include a processing unit 610 and a transceiver unit 620.

In a possible design, the communication apparatus 600 may correspond to the terminal device in the foregoing method embodiment, a component (such as a chip or a circuit) disposed (or used) in the terminal device, or another apparatus, module, circuit, or unit that can implement a method performed by the terminal device.

It should be understood that the communication apparatus 600 may correspondingly implement steps or procedures implemented by the terminal device in the method 200 or the method 500 in the embodiment of this application, and the communication apparatus 600 may include units configured to perform the method performed by the terminal device in the method 200 or the method 500 in FIG. 2 or FIG. 5. In addition, the units in the communication apparatus 600 and the foregoing other operations and/or functions are separately used to implement corresponding procedures in the method 200 or 500 in FIG. 2 or FIG. 5.

In some possible implementations, the transceiver unit 620 in the communication apparatus 600 may be an input/output interface or a circuit in a chip, and the processing unit 610 in the communication apparatus 600 may be a processor in the chip.

Optionally, the processing unit 610 may be configured to process instructions or data to implement a corresponding operation.

Optionally, the communication apparatus 600 may further include a storage unit 630. The storage unit 630 may be configured to store instructions or data. The processing unit 610 may read or execute the instructions or the data stored in the storage unit, to enable the communication apparatus to implement a corresponding operation. In a possible implementation, the transceiver unit 620 in the communication apparatus 600 may correspond to a transceiver 710 in a terminal device 700 shown in FIG. 7, and the storage unit 630 may correspond to a memory in the terminal device 700 shown in FIG. 7.

When the communication apparatus performs the method 200 shown in FIG. 2, for example, the processing unit is configured to record first information and start a timer after a terminal device is successfully handed over from a first network device to a target network device, where the first information indicates that the terminal device is successfully handed over from the first network device to the target network device. The processing unit is further configured to record second information and delete the first information when a connection between the terminal device and the target network device fails during running of the timer, where the second information indicates that the connection between the terminal device and the target network device fails. The apparatus includes a transceiver unit, configured to send the first information when the connection between the terminal device and the target network device fails during the running of the timer.

Optionally, the transceiver unit is further configured to send the second information when the connection between the terminal device and the target network device fails during the running of the timer.

Optionally, the processing unit is further configured to stop the timer when the connection between the terminal device and the target network device fails during the running of the timer.

When the communication apparatus performs the method 500 shown in FIG. 5, for example, the processing unit is configured to record first information after a terminal device is successfully handed over from a first network device to a target network device, where the first information indicates that the terminal device is successfully handed over from the first network device to the target network device. The processing unit is further configured to record second information after a connection between the terminal device and the target network device fails, where the second information indicates that the connection between the terminal device and the target network device fails, the second information includes first indication information, and the first indication information is used to determine a moment at which the terminal device receives a mobility command. The transceiver unit is configured to send the first information, and is further configured to send the second information.

Optionally, the processing unit is further configured to start a timer after the terminal device is successfully handed over from the first network device to the target network device; and the processing unit is specifically configured to record the second information when the connection between the terminal device and the target network device fails during running of the timer, where the second information includes second associated event indication information, and the second associated event indication information indicates that the terminal device has recorded or reported the first information in a mobility event corresponding to the second information.

Optionally, the processing unit is further configured to record first associated event indication information in the first information when the connection between the terminal device and the target network device fails during the running of the timer, where the first associated event indication information indicates that the terminal device has recorded or reported the second information in a mobility event corresponding to the first information, and/or the first associated event indication information indicates that the connection between the terminal device and the target network device fails during the running of the timer.

Optionally, the processing unit is further configured to stop the timer when the connection between the terminal device and the target network device fails during the running of the timer.

Optionally, the transceiver unit is further configured to receive running duration of the timer from the first network device.

It should be understood that a specific process in which the units perform the foregoing corresponding steps is described in detail in the foregoing method embodiment. For brevity, details are not described herein.

Figure 7:
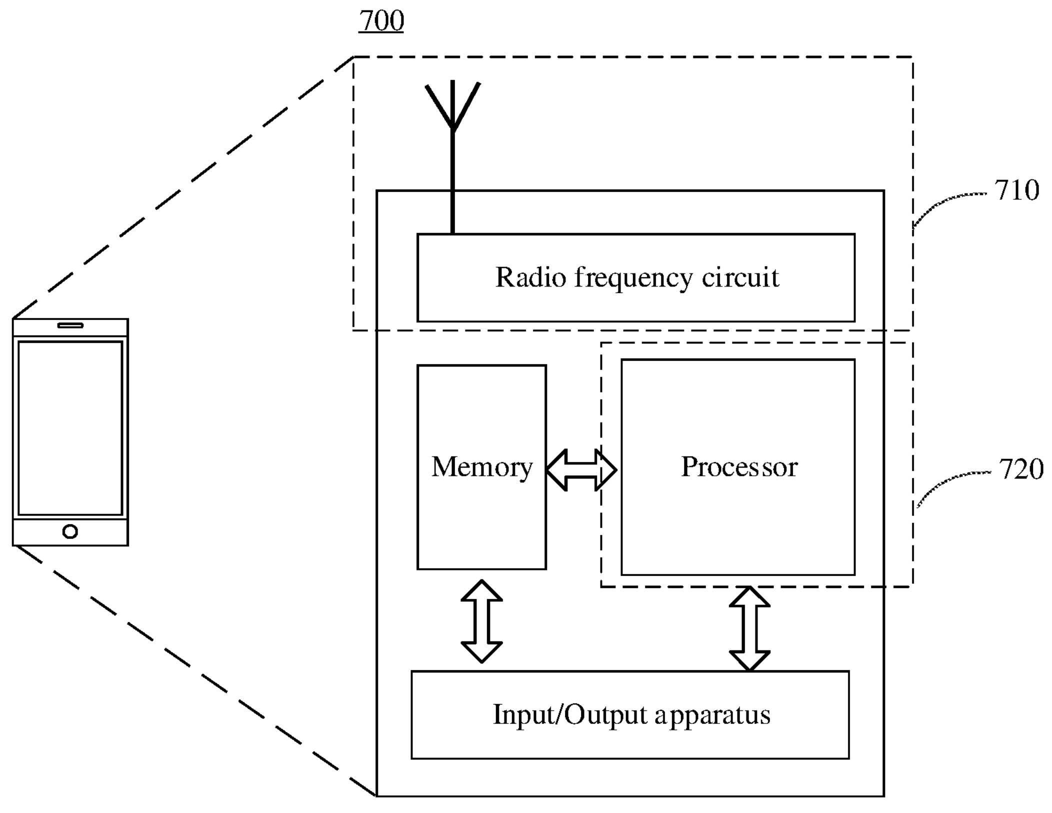
FIG. 7 is a schematic diagram of a structure of a terminal device applicable to an embodiment of this application.

It should be further understood that when the communication apparatus 600 is a terminal device, the transceiver unit 620 in the communication apparatus 600 may be implemented through a communication interface (for example, a transceiver, a transceiver circuit, a pin, or an input/output interface), for example, may correspond to the transceiver 710 in the terminal device 700 shown in FIG. 7. The processing unit 610 in the communication apparatus 600 may be implemented by using at least one processor, for example, may correspond to a processor 720 in the terminal device 700 shown in FIG. 7. The processing unit 610 in the communication apparatus 600 may be implemented by using at least one logic circuit.

In another possible design, the communication apparatus 600 may correspond to the network device in the foregoing method embodiment, for example, a component (such as a chip or a circuit) disposed (or used) in the network device, or another apparatus, module, circuit, or unit that can implement a method performed by the network device.

It should be understood that the communication apparatus 600 may correspondingly implement steps or procedures implemented by the network device in the method 200 or 500 in the embodiment of this application. The communication apparatus 600 may include units configured to perform the method performed by the network device in the method 200 or 500 in FIG. 2 or FIG. 5. In addition, the units in the communication apparatus 600 and the foregoing other operations and/or functions are separately used to implement corresponding procedures in the method 200 or 500 in FIG. 2 or FIG. 5.

In some possible implementations, the transceiver unit in the communication apparatus 600 is an input/output interface or a circuit in a chip, and the processing unit 610 in the communication apparatus 600 may be a processor in the chip.

Optionally, the processing unit 610 may be configured to process instructions or data to implement a corresponding operation.

Optionally, the communication apparatus 600 may further include a storage unit 630. The storage unit may be configured to store instructions or data. The processing unit may read or execute the instructions or the data stored in the storage unit 630, to enable the communication apparatus to implement a corresponding operation. In a possible implementation, the storage unit 630 in the communication apparatus 600 may correspond to a memory in a network device 800 shown in FIG. 8.

When the communication apparatus performs the method 200 shown in FIG. 2, for example, the transceiver unit is configured to receive first information or second information, where the first information indicates that a terminal device is successfully handed over from a first network device to a target network device, and the second information indicates that a connection between the terminal device and the target network device fails. The processing unit is configured to determine a mobility management parameter of the first network device based on the first information or the second information.

Optionally, the transceiver unit is further configured to send running duration of a timer to the terminal device, where the timer is used by the terminal device to determine a processing manner of the first information.

Optionally, the transceiver unit is specifically configured to receive the first information and/or the second information from the terminal device, a second network device, or a core network device.

Optionally, the transceiver unit is further configured to receive the running duration of the timer from the target network device or the core network device.

When the communication apparatus performs the method 500 shown in FIG. 5, for example, the transceiver unit is configured to receive first information, where the first information indicates that a terminal device is successfully handed over from a first network device to a target network device. The processing unit is further configured to receive second information, where the second information indicates that a connection between the terminal device and the target network device fails, the second information includes first indication information, and the first indication information is used to determine a moment at which the terminal device receives a mobility command or a moment at which the terminal device triggers a conditional handover. The processing unit is configured to determine, based on the first indication information, whether the first information and the second information are information in a same handover event.

Optionally, the transceiver unit is further configured to send the running duration of the timer to the terminal device, where the timer is used by the terminal device to determine whether to record the first associated event indication information and/or the second associated event indication information.

Optionally, during running of the timer, the transceiver unit is further configured to receive the running duration of the timer sent by the target network device or a core network device.

Optionally, the processing unit is further configured to determine, based on the first indication information, that a moment at which the terminal device corresponding to the first information receives the mobility command is the same as a moment at which the terminal device corresponding to the second information receives the mobility command.

The processing unit is further configured to determine that the first information and the second information are information in a same handover event.

Optionally, the processing unit is further configured to determine a mobility management parameter of the first network device based on the first information and/or the second information.

Optionally, the processing unit is specifically configured to determine that the connection between the terminal device and the target network device fails within a first time interval after the terminal device receives the mobility command or the terminal device triggers the conditional handover, or within a second time interval after the terminal device is successfully handed over to the target network device. The processing unit is specifically configured to determine the mobility management parameter of the first network device based on the second information, or determine the mobility management parameter of the first network device based on the first information and the second information.

Optionally, the processing unit is specifically configured to determine that the connection between the terminal device and the target network device fails after a first time interval after the terminal device receives the mobility command or the terminal device triggers the conditional handover, or after a second time interval after the terminal device is successfully handed over to the target network device. The processing unit is specifically configured to determine the mobility management parameter of the first network device based on the first information.

It should be understood that a specific process in which the units perform the foregoing corresponding steps is described in detail in the foregoing method embodiment. For brevity, details are not described herein.

Figure 8:
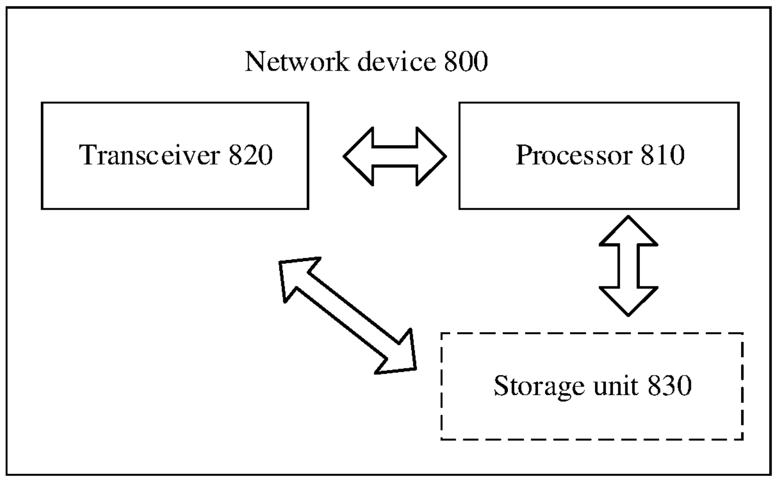
FIG. 8 is a schematic diagram of a structure of a network device applicable to an embodiment of this application.

It should be further understood that when the communication apparatus 600 is a network device, the transceiver unit 620 in the communication apparatus 600 may be implemented through a communication interface (for example, a transceiver, a transceiver circuit, a pin, or an input/output interface), for example, may correspond to a transceiver 810 in the network device 800 shown in FIG. 8. The processing unit 610 in the communication apparatus 600 may be implemented by using at least one processor, for example, may correspond to a processor 820 in the network device 800 shown in FIG. 8. The processing unit 610 in the communication apparatus 600 may be implemented by using at least one logic circuit.

FIG. 7 is a schematic diagram of a structure of a terminal device 700 according to an embodiment of this application. The terminal device 700 may be used in the system shown in FIG. 1, to perform functions of the terminal device in the foregoing method embodiments. As shown in the figure, the terminal device 700 includes a processor 720 and a transceiver 710. Optionally, the terminal device 700 further includes a memory. The processor 720, the transceiver 710, and the memory may communicate with each other through an internal connection path, to transfer a control signal and/or a data signal. The memory is configured to store a computer program. The processor 720 is configured to execute the computer program in the memory, to control the transceiver 710 to receive and send a signal.

The processor 720 and the memory may be integrated into a processing apparatus. The processor 720 is configured to execute program code stored in the memory, to implement the foregoing function. During specific implementation, the memory may alternatively be integrated into the processor 720, or may be independent of the processor 720. The processor 720 may correspond to a processing unit in FIG. 6.

The transceiver 710 may correspond to a transceiver unit in FIG. 6. The transceiver 710 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 700 shown in FIG. 7 can implement the processes related to the terminal device in the method embodiment shown in FIG. 2 or FIG. 5. Operations and/or functions of each module in the terminal device 700 are respectively used to implement the corresponding procedures in the foregoing method embodiment. For details, refer to the descriptions in the foregoing method embodiments. To avoid repetition, detailed descriptions are properly omitted herein.

The processor 720 may be configured to perform an action that is implemented inside the terminal device and that is described in the foregoing method embodiments, and the transceiver 710 may be configured to perform a sending action by the terminal device for the network device or a receiving action from the network device in the foregoing method embodiments. For details, refer to the descriptions in the foregoing method embodiments. Details are not described herein again.

Optionally, the terminal device 700 may further include a power supply, configured to supply power to various devices or circuits of the terminal device.

In addition, to make the functions of the terminal device more perfect, the terminal device 700 may further include one or more of an input unit, a display unit, an audio circuit, a camera, a sensor, and the like, and the audio circuit may further include a speaker, a microphone, and the like.

FIG. 8 is a schematic diagram of a structure of a network device according to an embodiment of this application. The network device 800 may be used in the system shown in FIG. 1, to perform functions of the network device in the foregoing method embodiments. For example, FIG. 8 may be a schematic diagram of a related structure of the network device. As shown in the figure, the network device 800 includes a processor 820 and a transceiver 810. Optionally, the network device 800 further includes a memory. The processor 820, the transceiver 810, and the memory may communicate with each other through an internal connection path, to transfer a control signal and/or a data signal. The memory is configured to store a computer program. The processor 820 is configured to execute the computer program in the memory, to control the transceiver 810 to receive and send a signal.

It should be understood that the network device 800 shown in FIG. 8 can implement the processes related to the network device in the method embodiment in FIG. 2 or FIG. 5. Operations and/or functions of each module in the network device 800 are respectively used to implement corresponding procedures in the foregoing method embodiment. For details, refer to the descriptions in the foregoing method embodiments. To avoid repetition, detailed descriptions are properly omitted herein.

It should be understood that the network device 800 shown in FIG. 8 may be an eNB or a gNB. Optionally, the network device includes a network device of a CU, a DU, an AAU, and the like. Optionally, the CU may be specifically classified into a CU-CP and a CU-UP. A specific architecture of the network device is not limited in this application.

An embodiment of this application further provides a processing apparatus, including a processor and a (communication) interface. The processor is configured to perform the method according to any one of the foregoing method embodiments.

It should be understood that, the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processor (DSP), a microcontroller unit (MCU), a programmable controller (programmable logic device, PLD), or another integrated chip.

In embodiments of this application, the memory may be a non-volatile memory, for example, a hard disk drive (HDD) or a solid-state drive (SSD), or may be a volatile memory, for example, a random access memory (random access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

According to the methods provided in embodiments of this application, this application further provides a computer program product. The computer program product includes computer program code (or instructions). When the computer program code is executed by one or more processors, an apparatus including the processor is enabled to perform the method in the embodiment shown in FIG. 2 or FIG. 5.

All or a part of the technical solutions provided in embodiments of this application may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by the computer, or a data storage device such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

According to the methods provided in embodiments of this application, this application further provides a computer-readable storage medium. The computer-readable storage medium stores program code (or instructions). When the program code is executed by one or more processors, an apparatus including the processor is enabled to perform the method in the embodiment shown in FIG. 2 or FIG. 5.

According to the methods provided in embodiments of this application, this application further provides a communication system, including the foregoing one or more network devices. The communication system may further include the foregoing one or more terminal devices.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For functions of a specific unit, refer to a corresponding method embodiment. There may be one or more processors.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of embodiments.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

recording first information after a terminal device is successfully handed over from a first network device to a target network device, wherein the first information indicates that the terminal device is successfully handed over from the first network device to the target network device;

recording second information after a connection between the terminal device and the target network device fails, wherein the second information indicates that the connection between the terminal device and the target network device fails, wherein the second information comprises first indication information, wherein the first indication information comprises first time information, wherein the first time information indicates a time interval between the terminal device determining to trigger a conditional handover and the second information being sent, wherein the first time information comprises a first time interval T1 and a second time interval T2, wherein the second time interval T2 is a time interval between the connection failing and the second information being sent, and the first time interval T1 is a time interval between the terminal device determining to trigger the conditional handover and the connection between the terminal device and the target network device failing, and wherein the first indication information is used to determine a moment at which the terminal device triggers the conditional handover; and sending, to one or more network devices, the first information and the second information; and wherein the terminal device determines to trigger the conditional handover based on determining that a condition for triggering the conditional handover is met, and the condition for triggering the handover is configured by the first network device to the terminal device in advance of the handover.

2. The method according to claim 1, wherein the method further comprises:

starting a timer after the terminal device is successfully handed over from the first network device to the target network device; and wherein the recording the second information comprises:

recording the second information after the connection between the terminal device and the target network device fails during running of the timer, wherein the second information comprises second associated event indication information, and the second associated event indication information indicates that the terminal device has recorded or reported the first information in a mobility event corresponding to the second information.

3. The method according to claim 2, wherein the method further comprises:

recording first associated event indication information in the first information based on the connection between the terminal device and the target network device failing during the running of the timer, wherein the first associated event indication information indicates at least one of that the terminal device has recorded or reported the second information in a mobility event corresponding to the first information or that the connection between the terminal device and the target network device fails during the running of the timer.

4. The method according to claim 2, wherein the method further comprises:

stopping the timer when the connection between the terminal device and the target network device fails during the running of the timer.

5. The method according to claim 1, wherein the first indication information further comprises first identifier information of the terminal device in a first cell.

6. The method according to claim 5, wherein the first cell is a serving cell of the terminal device before the handover, and wherein the first cell is managed by the first network device.

7. The method according to claim 6, wherein the first information comprises second indication information, and the second indication information further comprises one or more of the following:

identifier information of the first cell, wherein the first cell is the serving cell of the terminal device before the handover, and wherein the first cell is managed by the first network device;

first identifier information of the terminal device, wherein the first identifier information is identifier information of the terminal device in the first cell; or second time information, wherein the second time information indicates a time interval between the terminal device determining to trigger the conditional handover and the first information being sent.

8. An apparatus, comprising:

at least one processor, wherein the at least one processor is coupled to a non-transitory memory, the non-transitory memory stores a computer program, and when the computer program is executed by the at least one processor, the apparatus is caused to perform operations comprising:

receiving first information from a terminal device, wherein the first information indicates that the terminal device is successfully handed over from a first network device to a target network device;

receiving second information, wherein the second information indicates that a connection between the terminal device and the target network device fails, wherein the second information comprises first indication information, wherein the first indication information comprises first time information, wherein the first time information indicates a time interval between the terminal device determining to trigger a conditional handover and the second information being sent, wherein the first time information comprises a first time interval T1 and a second time interval T2, wherein the second time interval T2 is a time interval between the connection failing and the second information being sent, and the first time interval T1 is a time interval between the terminal device determining to trigger the conditional handover and the connection between the terminal device and the target network device failing;

determining, based on the first indication information, a moment at which the terminal device triggers the conditional handover; and determining, based on the first indication information, whether the first information and the second information are information in a same handover event; and wherein the conditional handover is triggered based on a determination that a condition for triggering the conditional handover is met, and the condition for triggering the handover is configured by the first network device to the terminal device in advance of the handover.

9. The apparatus according to claim 8, wherein the first information further comprises second indication information, and the second indication information comprises one or more of the following:

identifier information of a first cell, wherein the first cell is a serving cell of the terminal device before the handover event, and wherein the first cell is managed by the first network device;

first identifier information of the terminal device, wherein the first identifier information is identifier information of the terminal device in the first cell; and second time information, indicating a time interval between the terminal device determining to trigger the conditional handover and the first information being sent.

10. The apparatus according to claim 8, wherein the apparatus is caused to perform operations further comprising:

determining a mobility management parameter of the first network device based on at least one of the first information or the second information.

11. The apparatus according to claim 10, wherein the determining the mobility management parameter of the first network device based on at least one of the first information or the second information comprises:

determining that the connection between the terminal device and the target network device fails within one of a first time interval after the terminal device triggers the conditional handover or a second time interval after the terminal device is successfully handed over to the target network device; and performing one of:

determining the mobility management parameter of the first network device based on the second information; or determining the mobility management parameter of the first network device based on the first information and the second information.

12. The apparatus according to claim 10, wherein the determining the mobility management parameter of the first network device based on at least one of the first information or the second information comprises:

determining that the connection between the terminal device and the target network device fails after one of a first time interval after the terminal device triggers the conditional handover or a second time interval after the terminal device is successfully handed over to the target network device; and determining the mobility management parameter of the first network device based on the first information.

13. The apparatus according to claim 8, wherein the receiving first information comprises:

receiving the first information by a central unit (CU); and sending the first information from the CU to a distributed unit (DU); and wherein the receiving second information comprises:

receiving the second information by the CU; and sending the second information from the CU to a DU.

14. The apparatus according to claim 8, wherein the first indication information further comprises first identifier information of the terminal device, wherein the first identifier information is identifier information of the terminal device in a first cell.

15. The apparatus according to claim 14, wherein the first cell is a serving cell of the terminal device before the handover, and wherein the first cell is managed by the first network device.

16. A communication apparatus, comprising one or more processors configured to:

record first information after a terminal device is successfully handed over from a first network device to a target network device, wherein the first information indicates that the terminal device is successfully handed over from the first network device to the target network device;

record second information after a connection between the terminal device and the target network device fails, wherein the second information indicates that the connection between the terminal device and the target network device fails, wherein the second information comprises first indication information, wherein the first indication information comprises first time information, wherein the first time information indicates a time interval between the terminal device determining to trigger a conditional handover and the second information being sent, wherein the first time information comprises a first time interval T1 and a second time interval T2, wherein the second time interval T2 is a time interval between the connection failing and the second information being sent, and the first time interval T1 is a time interval between the terminal device determining to trigger the conditional handover and the connection between the terminal device and the target network device failing, and wherein the first indication information is used to determine a moment at which the terminal device triggers the conditional handover; and send the first information and the second information to at least one network device; and wherein the terminal device determines to trigger the conditional handover based on determining that a condition for triggering the conditional handover is met, and the condition for triggering the handover is configured by the first network device to the terminal device in advance of the handover.

17. The apparatus according to claim 16, wherein the first indication information further comprises first identifier information of the terminal device in a first cell.

18. The apparatus according to claim 17, wherein the first cell is a serving cell that is of the terminal device before the handover, and wherein the first cell is managed by the first network device.

19. The apparatus according to claim 18, wherein the first information comprises second indication information, and the second indication information further comprises one or more of the following:

identifier information of the first cell, wherein the first cell is the serving cell of the terminal device before the handover, and wherein the first cell is managed by the first network device;

first identifier information of the terminal device, wherein the first identifier information is identifier information of the terminal device in the first cell; and second time information, indicating a time interval between the terminal device determining to trigger the conditional handover and the first information being sent.

* * * * *